United States Patent
Williams

(10) Patent No.: US 10,676,893 B1
(45) Date of Patent: Jun. 9, 2020

(54) SELF-LEVELING FRONT-END LOADER HAVING A DOUBLE BOOM WITH A DOGLEG BEND OF 105 TO 135 DEGREES INCLUDING AN EXTENSION POWERED BY HYDRAULIC CYLINDERS

(71) Applicant: Larry Irby Williams, Beckville, TX (US)

(72) Inventor: Larry Irby Williams, Beckville, TX (US)

(*) Notice: Subject to any disclaimer, the term of this patent is extended or adjusted under 35 U.S.C. 154(b) by 0 days.

(21) Appl. No.: 16/565,700

(22) Filed: Sep. 10, 2019

(51) Int. Cl.
| | | |
|---|---|---|
| *E02F 3/34* | (2006.01) | |
| *E02F 3/43* | (2006.01) | |
| *E02F 3/38* | (2006.01) | |
| *E02F 3/42* | (2006.01) | |
| *E02F 9/18* | (2006.01) | |

(Continued)

(52) U.S. Cl.
CPC .......... *E02F 3/433* (2013.01); *A01D 87/0076* (2013.01); *A01D 87/122* (2013.01); *B66F 9/0655* (2013.01); *B66F 9/07554* (2013.01); *B66F 9/22* (2013.01); *E02F 3/3402* (2013.01);
(Continued)

(58) Field of Classification Search
CPC ........ E02F 3/3402; E02F 3/306; E02F 3/4136
See application file for complete search history.

(56) References Cited

U.S. PATENT DOCUMENTS 2,472,223 A   6/1949  McElhinney et al.
2,645,369 A   7/1953  Allan
(Continued)

FOREIGN PATENT DOCUMENTS

EP   2440711 B1   4/2014

OTHER PUBLICATIONS

Website: https://www.grainews.ca/2015/04/23/loader-tractor-or-telehandler/ Downloaded Feb. 19, 2017 "JCB executives believe once North American farmers get used to telescopic handlers, they'll never go back to a conventional ag tractor and loader" Telescopic handlers can lift loads to much greater heights than a standard ag tractor with front-end loader and the extended reach of the articulated telescopic loader gives an operator greater flexibility when handling loads like large round bales.
(Continued)

*Primary Examiner* — Gerald McClain
(74) *Attorney, Agent, or Firm* — Russ Weinzimmer & Associates, P.C.

(57) ABSTRACT

A self-leveling front-end loader for attachment to a tractor. The self-leveling front-end loader includes a support structure configured to be attached to the tractor, and two extendable booms, each boom including a proximal leg, a distal leg, and a self-leveling hydraulic linkage configured to maintain the tilt angle of an accessory, such as a bucket. Each extendable boom has a boom extension hydraulic cylinder for extending the boom by up to 2 to 4 feet, a lift hydraulic cylinder to lift each boom, a self-leveling hydraulic cylinder, and a tilt hydraulic cylinder to tilt the accessory. The extendable booms enhance the capability of the front-end loader to position payload higher and farther than a standard front end loader, while preserving the stability and lifting capacity of the front-end loader. The booms have a traditional "dogleg" bend of 105 to 135 degrees, providing the two booms a wide range of motion.

9 Claims, 17 Drawing Sheets

(51) Int. Cl.
*B66F 9/22* (2006.01)
*A01D 87/12* (2006.01)
*E02F 9/22* (2006.01)
*A01D 87/00* (2006.01)
*B66F 9/075* (2006.01)
*B66F 9/065* (2006.01)

(52) U.S. Cl.
CPC .............. *E02F 3/382* (2013.01); *E02F 3/422* (2013.01); *E02F 9/18* (2013.01); *E02F 9/2271* (2013.01)

(56) References Cited

U.S. PATENT DOCUMENTS

| | | | |
|---|---|---|---|
| 2,698,106 A | | 12/1954 | McElhinney et al. |
| 2,846,097 A | | 8/1958 | Beyerstedt |
| 3,215,292 A | | 11/1965 | Halls |
| 3,237,792 A | | 3/1966 | Boehmer |
| 3,812,979 A | | 5/1974 | Leihgeber |
| 3,862,697 A | * | 1/1975 | Gill .......................... E02F 3/308 414/700 |
| 3,927,781 A | * | 12/1975 | Okabe ...................... E02F 3/308 414/700 |
| 4,147,263 A | | 4/1979 | Frederick et al. |
| 4,255,076 A | | 3/1981 | Svenning |
| 4,280,783 A | * | 7/1981 | Hayward ................ E02F 3/432 414/686 |
| 4,301,607 A | * | 11/1981 | Inui .......................... E02F 3/30 37/415 |
| 4,306,832 A | * | 12/1981 | Schmiesing .......... E02F 3/3402 414/692 |
| 4,354,797 A | * | 10/1982 | Hirose ..................... E02F 3/437 414/700 |
| 4,394,108 A | | 7/1983 | Cook et al. |
| 4,413,944 A | | 11/1983 | Coe |
| 4,504,185 A | * | 3/1985 | Yagyu ..................... F15B 11/20 414/700 |
| 4,522,554 A | | 6/1985 | Williams et al. |
| 4,775,288 A | | 10/1988 | Dimitriu |
| 4,854,811 A | * | 8/1989 | Veys ......................... E02F 3/34 414/718 |
| 4,999,022 A | * | 3/1991 | Veys ........................ E02F 3/345 172/819 |
| 5,120,186 A | | 6/1992 | Jorgenson |
| 5,895,199 A | | 4/1999 | Baumert, III et al. |
| 6,530,742 B2 | | 3/2003 | Trinler et al. |
| 6,726,437 B2 | | 4/2004 | Albright et al. |
| 7,044,705 B2 | * | 5/2006 | Way ....................... B66F 9/0655 414/700 |
| 7,329,082 B2 | | 2/2008 | Warren |
| 8,103,418 B2 | | 1/2012 | Osswald et al. |
| 8,429,801 B2 | | 4/2013 | Schikevitz et al. |
| 8,602,153 B2 | | 12/2013 | Osswald et al. |
| 9,206,026 B2 | | 12/2015 | Aulton et al. |
| 9,267,262 B2 | * | 2/2016 | Fuerst ...................... E02F 3/38 |
| 9,528,251 B2 | | 12/2016 | Oyama et al. |
| 10,208,450 B2 | * | 2/2019 | Hauer ................... E02F 3/3411 |
| 2004/0091347 A1 | * | 5/2004 | Hackett ................. B28C 5/4272 414/685 |
| 2006/0180563 A1 | | 8/2006 | Knight |
| 2007/0240928 A1 | * | 10/2007 | Coltson ................ B62D 7/1509 180/411 |
| 2015/0093226 A1 | * | 4/2015 | Faivre .................. A01B 63/108 414/686 |

OTHER PUBLICATIONS

Website: http://www.lislesurplus.com/F/Frontend-loader-telescopic-boom-for-john-deere-kubota/ Downloaded Feb. 19, 2017 "Front End Loader Telescopic Boom for John Deere, Kubota" Brand New Telescopic Boom for Tractors & Skid Steer Loaders.

Website: http://everunmachinery.en.made-inchina.com/product/UXMmNxrCAcky/China-Everun-Snow-Blower-Front-Loader-Tractor-Front-End-Loader-with-Telescopic-Loader.html Downloaded Feb. 19, 2017 Everun Snow Blower Front Loader, Tractor Front End Loader with Telescopic Loader.

Website: https://www.gamka.com/construction-equipment-rentals/wacker-neusonconstruction-equipment/wacker-neuson-wheel-loaders/ Downloaded Feb. 19, 2017 Wacker Neuson 750T All Wheel Steer Telescopic Wheel Loaders The 750T wheel loaders feature a telescopic boom for additional height, added versatility and greater production.

Website: http://www.bullindia.com/tractor-attachment.php Downloaded Feb. 19, 2017 Front End Loader Front end loader is a tractor attachment which is more suitable for heavy duty applications in Agriculture, Construction and several Industrial segments. Loader is detachable and so are the loader buckets. The loader comes with application specific 40 + types of bucket options which are compatible with more than 140 models of Tractors.

Website: http://kishanloader.com/telescopic-loader-for-cotton-industry.html Downloaded Feb. 19, 2017 Telescopic Loader for Cotton Industry Unloading attachment used with a heavy duty range tractor 4WD of 55 to 70 HP capacity. This is a useful attachment for low weight work which require large height useful for cotton industries, construction, sugar industries etc. The attachment is light in weight.

YouTube: https://youtu.be/5ovUcEfDD4w Downloaded Feb. 19, 2017 Bull Telescopic Loader on John Deere Tractor Handling Husk.

YouTube: https://youtu.be/5ovUcEfDD4w Downloaded Feb. 19, 2017 Bull Telescopic Loader on Mahindra Loading Husk.

* cited by examiner

SELF-LEVELING FRONT-END LOADER HAVING A DOUBLE BOOM WITH A DOGLEG BEND OF 105 TO 135 DEGREES INCLUDING AN EXTENSION POWERED BY HYDRAULIC CYLINDERS

FIELD OF THE INVENTION

This invention relates generally to powered loaders, and more particularly to tractor front-end loaders that include booms that are shaped in an obtuse dogleg bend, or an equivalent curved bend.

BACKGROUND OF THE INVENTION

Front-end loaders are popular additions to compact utility tractors and larger farm tractors. Compact Utility Tractors (CUT) are small tractors typically having 18 to 50 horsepower, and are often used to perform grounds maintenance, landscaping, and farming tasks. Most commonly these tractors are 2-wheel drive, although some CUTs are 4-wheel drive. Typically, front-end loaders include two booms, each boom being either a traditional "dogleg" style, or a curved arm style.

Front-end loaders on compact utility tractors are capable of many tasks and can include many optional accessories. For example, bucket accessories are commonly used to move dirt, sand, and gravel from one area to another, and a tooth bar accessory can be added to the front edge of the bucket to aid with digging. Some front-end loaders are equipped with a quick coupler, otherwise known as a quick attach system. The quick attach system allows accessories, such as the bucket, to be removed easily and then allows another accessory to be quickly attached. Other common accessories include pallet forks for lifting pallets of goods, or bale spears for lifting bales of hay or other soft materials.

In the agricultural industry, as well as in the construction industry, the majority of front-end loaders that are attached to a compact utility tractor or a farm tractor are of the same structure. Typically, the front-end loader includes two booms, each boom being an obtuse angled "dogleg" boom that has a fixed, hinged point of attachment that serves as a load bearing base. The two booms are usually made of tubular boxed steel, and included is a "cross piece" toward the front of the assembly that holds the two booms together at a fixed distance with respect to each other.

Working on materials located at the ground level immediately in front of the tractor is a very common work application for front-end loaders. An example of this application would be using a front-end loader bucket accessory to scoop up gravel from a pile of gravel located immediately in front of the tractor. To manipulate materials at ground level immediately in front of the tractor, the booms must be lowered to a position where the front ends of the booms are near, or are at, the ground level.

To accomplish lowering the accessory to ground level, traditionally each boom has a "dogleg" obtuse angular bend of 105 to 135 degrees. This "dogleg" bend prevents the booms, when in the lowered position, from striking against the front wheels of the tractor, or from striking against other parts of the tractor, such as the front fenders. The "dogleg" bend allows the booms to arch over the tractor wheel areas and to extend down to the ground area in front of the tractor, allowing an accessory, such as a bucket, to work at the ground level immediately in front of the tractor.

In addition, the "dogleg" bend in each boom allows the accessory, such as the bucket or the bale spears, to place the payload onto the truck or the wagon without the underside of the booms striking against the side of the truck or against parts of the wagon.

The "dogleg" bend in each boom is located midway between the hinged point of attachment of the boom to the tractor at the load bearing base, and the traveling end of the boom where the bucket (or other accessory) is mounted to the boom.

In recent years, to add a "stylish" or "streamlined" look to their products, some loader manufacturers have replaced the obtuse dogleg angle in the midsection of the boom with a gentle continuous arc bend that runs from one end of the boom to the other end. Nevertheless, this continuous arc bend accomplishes the same objectives as an obtuse 105 degree to 135 degree dogleg bend—namely, to arch over the front wheel areas of the tractor, while still having the front ends of the booms extend to reach the ground level immediately in front of the tractor.

Many front-end loaders have a self-leveling option that includes a mechanical linkage that maintains the bucket (or any attachment that replaces the bucket) at a constant tilt angle as the booms are raised and lowered. As the height of the bucket is changed, the self-leveling linkage keeps the bucket accessory at the same tilt angle. Accordingly, this type of front-end loader is called a self-leveling front-end loader.

Front-end loaders mounted on compact utility tractors are traditionally used to load material on a truck such as a dump truck, and lift bales of hay or other materials onto a flatbed truck or a hay wagon. Unfortunately, the terrain of the construction/work site and/or the height of the truck may prevent the front-end loader from effectively reaching the height of the truck so that the material can be placed on the truck (or wagon). In addition, if the front-end loader attempts to lift and place a bale on top of other bales that have already been placed on the truck, the front-end loader booms may not have adequate reach to lift and place the bale at such a high position.

In an effort to address this issue of inadequate boom length, a commercially available telescopic front-end loader is sold by Kishan Equipment of Rajkot, India (www.kishan-loader.com) for use in the cotton industry. This front-end loader has a double boom configuration, with each boom being extendable by hydraulic power to increase the boom length, and therefore extend the reach of the loader. However, the two booms are of a straight design, and therefore do not have the 105 to 135 degree angle that is typical of a common front end loader. Because the booms are straight and have no bend, this design cannot be used to manipulate materials immediately in front of the tractor, since when lowered, the straight booms would not be able to reach ground level without striking the front wheels of the tractor. The wheels therefore prevent the straight booms from reaching the ground level immediately in front of the tractor.

Also, this front-end loader of Kishan Equipment of India has booms that extend outward approximately from 7 to 17 feet in front of the tractor. Extending the booms to such a great length reduces the stability and lifting capacity of the entire machine. In addition, the substantial weight of the booms, combined with the large forward boom extension length, add a large tilting force to the tractor. To compensate for the large tilting force of the long booms, the tractor must include a large compensating rear counterweight that is mounted on the back of the tractor. However, the mounting of the large rear counterweight on the tractor eliminates the availability of the tractor's rear draw bar and rear power lift, and the rear placement of the large weight makes the mounting of any rear accessories impossible. This greatly reduces application of this machine to handling only lightweight materials, and prevents the tractor from having any rear accessory tools.

SUMMARY OF THE INVENTION

The front-end loader of the invention includes an extendable boom that extends the lift height and reach of the front end loader by 2 to 4 feet, greatly enhancing the capability of the front-end loader to position its payload higher and farther than a standard front end loader. The 2 to 4 feet boom extension does not significantly reduce the stability and lifting capacity of the front-end loader. This maximum extension length of 2 to 4 feet may require additional counterweights, but this can be entirely accomplished by using rear wheel weights that are a standard option on most tractor models. Requiring only rear wheel weights allows the rear drawbar and the power lift of the tractor to be available for use while the front-end loader is in service, and rear accessories or tools, such as a back hoe, can be left in place attached to the rear of the tractor, saving the tractor operator time and effort.

The front-end loader of the invention includes a self-leveling hydraulic linkage that maintains the bucket (or any attachment that replaces the bucket) at a constant tilt angle, as the booms are raised and lowered. No matter to what height the bucket is raised, the self-leveling hydraulic linkage keeps the bucket accessory at the same tilt angle.

The self-leveling hydraulic linkage includes a self-leveling hydraulic cylinder. In addition, the extendable boom includes an extension hydraulic cylinder that extends and retracts the extendable boom. The self-leveling hydraulic cylinder and the extension hydraulic cylinder are configured as a series hydraulic circuit. This series hydraulic circuit integrates the self-leveling hydraulics with the extension hydraulics of the extendable boom. The self-leveling hydraulic cylinder and the extension hydraulic cylinder are integrated and work together simultaneously so as to preserve the self-leveling function while the extendable boom is being extended and retracted.

The front-end loader of the invention includes booms having a traditional "dogleg" bend of 105 to 135 degrees that are found in most front-end loader booms. The dogleg booms allow the booms to arch over the tractor wheel areas and to extend down to the ground area in front of the tractor, enabling an accessory, such as a bucket, to work at the ground level, immediately in front of the tractor. In addition, the "dogleg" bend in each boom allows the accessory, such as the bucket or bale spears, to place the payload on a structure, such as a truck or a wagon, without the underside of the booms striking against the structure being loaded.

As an example, if the booms of the front-end loader are in an elevated position to lift a bale of hay onto a flatbed truck, but the lifted bale is not high enough to place on top of the other bales already on the truck, at this point in the lift cycle the boom extension can be actuated an additional 2 to 4 feet, and the forward extended reach can therefore place the bale at the desired height. In another example, if the booms of the front-end loader are in an elevated position to retrieve a bale of hay from the far side of a flatbed truck, but the bale spears cannot reach the far side of the bed of the truck, at this point in the lift cycle the boom extension can be actuated an additional 2 to 4 feet, and the forward extended reach can therefore reach the bales at the far side of the truck.

The front-end loader of the invention has extendable booms that can include linear bearings or wear pads to provide a long service life.

A general aspect of the invention is a front-end loader for attachment to a tractor or a rubber tired construction backhoe, the front-end loader including hydraulic cylinders, each hydraulic cylinder having a cylinder barrel, a piston rod, a proximal end, and a distal end. The front-end loader includes: a support structure configured to be attached to the tractor, the support structure having an upper attachment portion and a lower attachment portion; two booms, each boom including: a proximal leg having a pivot end and an extension end, the pivot end being pivotally attached to the upper attachment portion, and a boom extension hydraulic cylinder, having the proximal end attached to the proximal leg, and a distal leg having an extension end and an accessory support end, the extension end of the distal leg being attached to the distal end of the boom extension hydraulic cylinder; a lift hydraulic cylinder having a proximal end and a distal end, the proximal end of the lift hydraulic cylinder pivotally attached to the lower attachment portion of the support structure, and the distal end of the lift hydraulic cylinder being pivotally attached to the extension end of the proximal leg; a tilt hydraulic cylinder having a proximal end and a distal end, the distal end of the tilt hydraulic cylinder being configured to pivotally attach to an implement assembly that is configured to be pivotally attached to the accessory support end of the distal leg; and a self-leveling linkage, including: a self-leveling cylinder, having a proximal end and a distal end, the proximal end of the self-leveling cylinder pivotally attached to the upper attachment portion of the support structure, the self-leveling cylinder being in fluid communication with the boom extension hydraulic cylinder, and the self-leveling cylinder and the boom extension hydraulic cylinder configured in a series hydraulic circuit, and a connecting linkage pivotally attached to the extension end of the distal leg, the connecting linkage pivotally connected to the distal end of the self-leveling cylinder, and the connecting linkage pivotally connected to the proximal end of the tilt hydraulic cylinder, such that a movement of the distal end of the self-leveling cylinder corresponds to a linked movement of the proximal end of the tilt hydraulic cylinder.

In some embodiments, the distal leg of each boom includes an extension shaft that is fixedly attached to the extension end of the distal leg, the extension shaft being slidably supported by a receptacle at the extension end of the proximal leg.

In some embodiments, the receptacle within the extension end of the proximal leg includes wear pads configured to slidably support the extension shaft of the distal leg.

In some embodiments, the boom extension hydraulic cylinder and the self-leveling cylinder are configured in the series hydraulic circuit such that the boom extension hydraulic cylinder and the self-leveling cylinder each co-extend by a substantially equal distance, and the boom extension hydraulic cylinder and the self-leveling cylinder each co-retract by a substantially equal distance.

In some embodiments, a cross member is attached to each of the two booms.

In some embodiments, each boom extension hydraulic cylinder extends a respective boom of the two booms by 2 to 4 feet.

In some embodiments, each boom extension hydraulic cylinder is configured to extend and retract the two booms AFTER the lift hydraulic cylinder has raised the two booms to a raised position.

In some embodiments, the front-end loader further includes: conventional wheel weights to provide additional counter weight for added stability.

In some embodiments, the distal leg of each boom extends from the proximal leg of the boom at a 105 to 135 degree angle.

In some embodiments, the distal end of each distal leg of the two booms is configured to attach to an accessory, including at least one of: a bucket, pallet forks, hay forks, bale spears.

BRIEF DESCRIPTION OF THE FIGURES

Many additional features and advantages will become apparent to those skilled in the art upon reading the following description, when considered in conjunction with the accompanying drawings, wherein.

DETAILED DESCRIPTION

Figure 1A:
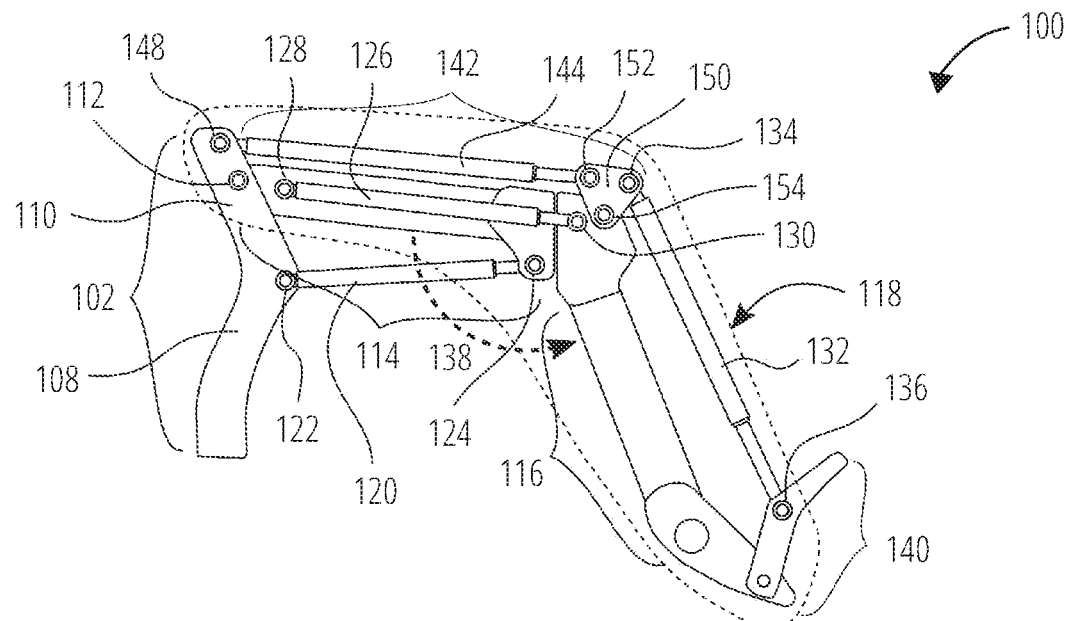
FIG. 1A is a side view of the front-end loader showing the accessory support end in a lowered position, the lift hydraulic cylinder in the retracted position, the boom extension hydraulic cylinder in the retracted position, also having the extension shaft of the distal leg fully retracted into the receptacle of the proximal leg of the boom, and having the self-leveling cylinder in the retracted position.

With reference to FIG. 1A, a side view of a front-end loader 100 is shown having an extendable boom 118, the boom 118 including a proximal leg 114 and distal leg 116. The boom 118 is shown having a boom extension hydraulic cylinder 126 in a retracted position, and having a lift hydraulic cylinder 120 in a retracted position, corresponding to the distal leg 116 accessory support end 140 being in a lowered position.

The distal end of the lift hydraulic cylinder 120 is pivotally attached to the distal end of the proximal leg 114 at the distal lift attachment 124. As the lift hydraulic cylinder 120 extends, the proximal leg 114 and the boom 118 are raised, and as the lift hydraulic cylinder 120 retracts, the proximal leg 114 and the boom 118 are lowered.

Figure 3:
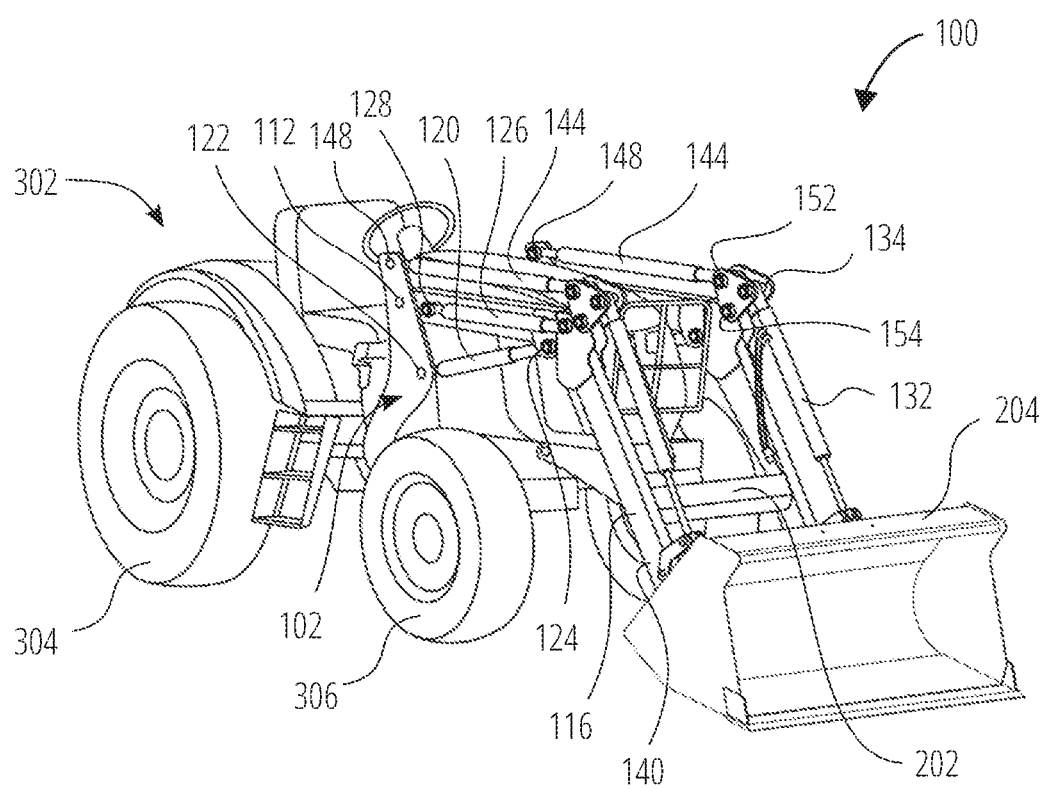
FIG. 3 is a perspective front and side view of the front-end loader mounted on a tractor and attached to a bucket accessory, showing the front-end loader and the bucket in the lowered position, having each lift hydraulic cylinder in the retracted position, each boom extension hydraulic cylinder in the retracted position, having the extension shaft of each distal leg fully retracted into the receptacle of the proximal leg of each boom, and having each self-leveling cylinder in the retracted position.

The front-end loader 100 includes a support structure 102 configured to be mounted on a tractor 302 (shown in FIG. 3). The support structure 102 includes a lower attachment portion 108 that pivotally supports the proximal end of the lift hydraulic cylinder 120 at the proximal lift attachment 122. The support structure 102 also includes an upper attachment portion 110 configured to pivotally support the proximal leg 114 of the boom 118 at the proximal leg pivot 112.

The distal leg 116 of the boom 118 is extendable from the proximal leg 114. In this view, the boom extension hydraulic cylinder 126 is shown in the retracted position, and accordingly the distal leg 116 is in the retracted position with respect to the proximal leg 114. The proximal end of the boom extension hydraulic cylinder 126 is attached to the proximal end of the proximal leg 114 at a proximal extension attachment 128. The distal end of the boom extension hydraulic cylinder 126 is attached to the proximal end of the distal leg 116 at the distal extension attachment 130.

A self-leveling linkage 142 includes a self-leveling cylinder 144 and a linkage connector 150. The linkage connector 150 is configured to attach to: the distal leg 116 at the linkage lower attachment 154, the self-leveling cylinder 144 at the self-leveling distal attachment 152, and the tilt hydraulic cylinder 132 at the proximal tilt attachment 134.

As the boom extension hydraulic cylinder 126 is in the retracted position, the self-leveling cylinder 144 is also in the retracted position. The proximal end of the self-leveling cylinder 144 is attached to a self-leveling proximal attachment 148 of the support structure 102. The distal end of the self-leveling cylinder 144 is attached to the linkage connector 150 at the self-leveling distal attachment 152.

The distal leg 116 includes a tilt hydraulic cylinder 132 which controls the tilt angle of an accessory, such as a bucket 204 (shown in FIG. 2A), the accessory being attached to and supported by the accessory support end 140. The tilt hydraulic cylinder 132 is pivotally attached to the linkage connector 150 by a proximal tilt attachment 134, and also is pivotally attached to the accessory support end 140 by a distal tilt attachment 136.

In this embodiment, the distal leg 116 extends from the proximal leg 114 at a boom legs angle 138 of 105 to 135 degrees.

Figure 1B:
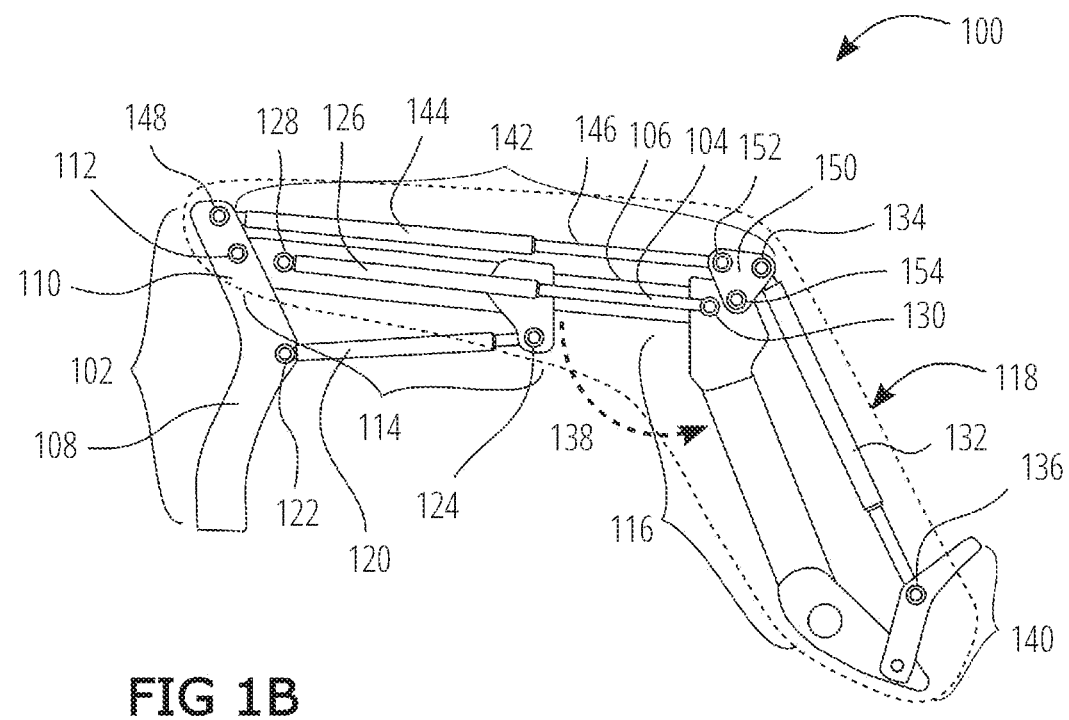
FIG. 1B is a side view of the front-end loader of FIG. 1A, showing the boom extension hydraulic cylinder in the partially extended position, also having the extension shaft of the distal leg partially extended from the receptacle of the proximal leg of the boom, thereby extending the reach of the boom, and having the self-leveling cylinder in the partially extended position.

With reference to FIG. 1B, a side view of a front-end loader 100 is shown having an extendable boom 118, the boom 118 including a proximal leg 114 and distal leg 116. The boom 118 is shown having a boom extension hydraulic cylinder 126 in the partially extended position, and having a lift hydraulic cylinder 120 in a retracted position, corresponding to the distal leg 116 accessory support end 140 being in a lowered position.

The distal end of the lift hydraulic cylinder 120 is pivotally attached to the distal end of the proximal leg 114 at the distal lift attachment 124. As the lift hydraulic cylinder 120 extends, the proximal leg 114 and the boom 118 are raised, and as the lift hydraulic cylinder 120 retracts, the proximal leg 114 and the boom 118 are lowered.

The front-end loader 100 includes a support structure 102 configured to be mounted on a tractor 302 (shown in FIG. 3). The support structure 102 includes a lower attachment portion 108 that pivotally supports the proximal end of the lift hydraulic cylinder 120 at the proximal lift attachment 122. The support structure 102 also includes an upper attachment portion 110 configured to pivotally support the proximal leg 114 of the boom 118 at the proximal leg pivot 112.

The distal leg 116 of the boom 118 is extendable from the proximal leg 114. The distal leg 116 is shown in the partially extended position with respect to the proximal leg 114, corresponding to the boom extension hydraulic cylinder 126 being in the partially extended position, and both the extension shaft 106 and an extension cylinder piston rod 104 also being in partially extended positions.

The proximal end of the boom extension hydraulic cylinder 126 is attached to the proximal end of the proximal leg 114 at a proximal extension attachment 128. The distal end of the boom extension hydraulic cylinder 126 is attached to the proximal end of the distal leg 116 at the distal extension attachment 130.

A self-leveling linkage 142 includes a self-leveling cylinder 144 and a linkage connector 150. The linkage connector 150 is configured to attach to: the distal leg 116 at the linkage lower attachment 154, the self-leveling cylinder 144 at the self-leveling distal attachment 152, and the tilt hydraulic cylinder 132 at the proximal tilt attachment 134.

As the boom extension hydraulic cylinder 126 is in the partially extended position, the self-leveling cylinder 144 is also in the partially extended position. The proximal end of the self-leveling cylinder 144 is attached to a self-leveling proximal attachment 148 of the support structure 102. The distal end of the self-leveling cylinder 144 is attached to the linkage connector 150 at the self-leveling distal attachment 152.

The self-leveling cylinder 144 and the boom extension hydraulic cylinder 126 are integrated and simultaneously work together by extending together and retracting together, to preserve a self-leveling function while the extendable boom 118 is being extended and retracted.

The distal leg 116 includes a tilt hydraulic cylinder 132 which controls the tilt angle of an accessory, such as a bucket 204 (shown in FIG. 2A), the accessory being attached to and supported by the accessory support end 140. The tilt hydraulic cylinder 132 is pivotally attached to the linkage connector 150 by a proximal tilt attachment 134, and also is pivotally attached to the accessory support end 140 by a distal tilt attachment 136.

In this embodiment, the distal leg 116 extends from the proximal leg 114 at a boom legs angle 138 of 105 to 135 degrees.

Figure 2A:
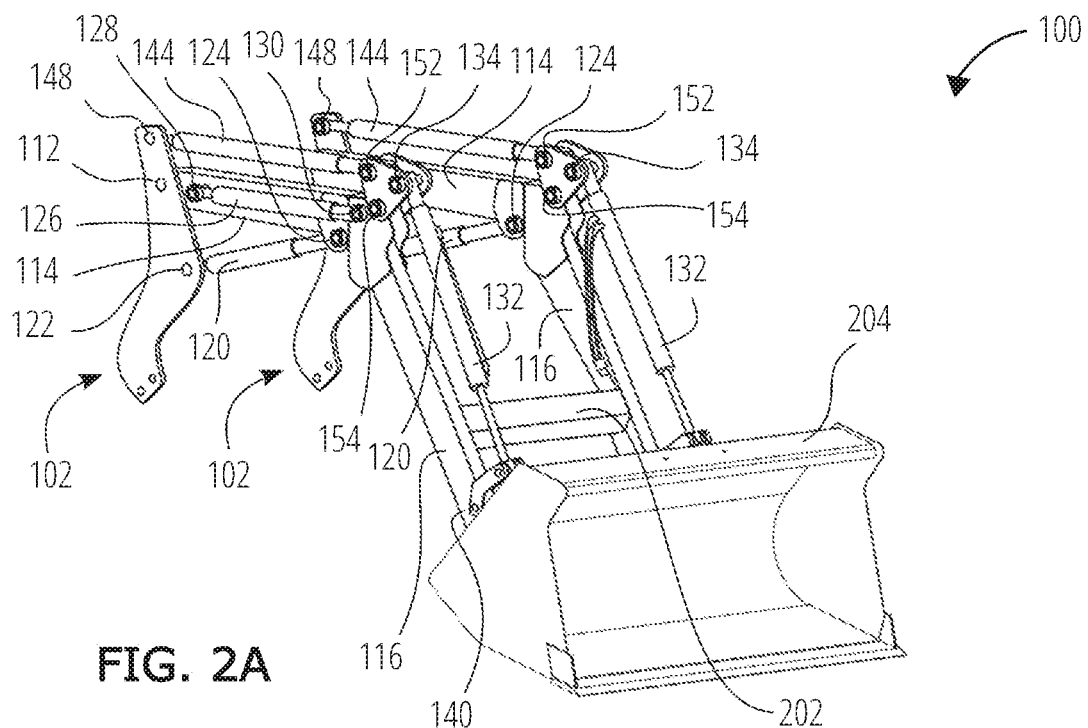
FIG. 2A is a perspective front and side view of the front-end loader attached to a bucket accessory, showing the front-end loader and the bucket in a lowered position, having each lift hydraulic cylinder in the retracted position, each boom extension hydraulic cylinder in the retracted position, also having the extension shaft of each distal leg fully retracted into the receptacle of the proximal leg of each boom, and having each self-leveling cylinder in the retracted position.

With reference to FIG. 2A, a perspective front and side view of a front-end loader 100 is shown having an extendable boom 118 (shown in FIG. 1A), the boom 118 including a proximal leg 114 and distal leg 116. A boom extension hydraulic cylinder 126 is in a retracted position, and the self-leveling cylinder 144 is in the retracted position. The self-leveling cylinder 144 and the boom extension hydraulic cylinder 126 are integrated and simultaneously work together, by extending together and retracting together to preserve a self-leveling function while each extendable boom 118 is being extended and retracted.

The lift hydraulic cylinder 120 is in a retracted position, corresponding to the distal leg 116 accessory support end 140 and the bucket 204 being in a lowered position.

The front-end loader 100 includes a support structure 102 configured to be mounted on a tractor 302 (shown in FIG. 3). The support structure 102 pivotally supports the proximal end of the lift hydraulic cylinder 120 at the proximal lift attachment 122. The support structure 102 is also configured to pivotally support the proximal leg 114 of the boom 118 (shown in FIG. 1A) at the proximal leg pivot 112.

The distal end of the lift hydraulic cylinder 120 is pivotally attached to the distal end of the proximal leg 114 at the distal lift attachment 124. The boom 118 is shown in a lowered position; however, as the lift hydraulic cylinder 120 extends, the proximal leg 114 and the boom 118 are raised, and as the lift hydraulic cylinder 120 retracts, the proximal leg 114 and the boom 118 are lowered.

The distal leg 116 of the boom 118 is extendable from the proximal leg 114. The boom extension hydraulic cylinder 126 is shown in the retracted position, and therefore the distal leg 116 is in the retracted position with respect to the proximal leg 114. The proximal end of the boom extension hydraulic cylinder 126 is attached to the proximal end of the proximal leg 114 at a proximal extension attachment 128. The distal end of the boom extension hydraulic cylinder 126 is attached to the proximal end of the distal leg 116 at the distal extension attachment 130.

The distal leg 116 includes a tilt hydraulic cylinder 132 which controls the tilt angle of an accessory, such as the bucket 204, the accessory being attached to and supported by the accessory support end 140. The tilt hydraulic cylinder 132 is pivotally attached to the proximal end of the distal leg 116 by a proximal tilt attachment 134, and also is pivotally attached to the accessory support end 140 by a distal tilt attachment 136 (shown in FIG. 1A).

Figure 2B:
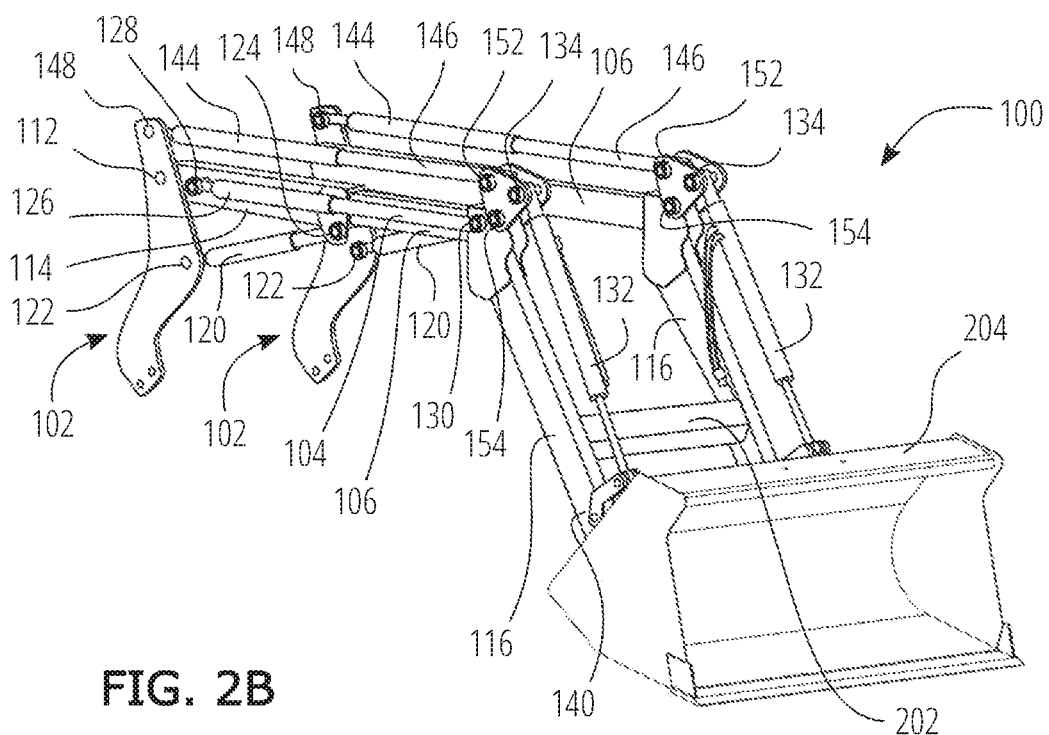
FIG. 2B is a perspective front and side view of the front-end loader and bucket accessory of FIG. 2A, showing each boom extension hydraulic cylinder in the extended position, also having the extension shaft of each distal leg fully extended from the receptacle of the proximal leg of each boom, thereby extending the forward reach of each boom, and having each self-leveling cylinder in the extended position.

With reference to FIG. 2B, a perspective front and side view of a front-end loader 100 is shown, having an extendable boom 118 (shown in FIG. 1B), the boom 118 including a proximal leg 114 and distal leg 116. The boom 118 is shown in an extended position, having the boom extension hydraulic cylinder 126, the extension shaft 106, the extension cylinder piston rod 104, and the self-leveling cylinder 144 in extended position.

The self-leveling cylinder 144 and the boom extension hydraulic cylinder 126 are integrated and simultaneously work together, by extending together and retracting together to preserve the self-leveling function while each extendable boom 118 is being extended and retracted.

The lift hydraulic cylinder 120 is in the retracted position corresponding to the distal leg 116 of the boom 118 and the bucket 204 being in a lowered position. The front-end loader 100 includes the support structure 102 configured to be mounted on the tractor 302 (shown in FIG. 3B). The support structure 102 pivotally supports the proximal end of a lift hydraulic cylinder 120 at the proximal lift attachment 122. The support structure 102 is also configured to pivotally support the proximal leg 114 of the boom 118 (shown in FIG. 1B) at the proximal leg pivot 112.

The distal end of the lift hydraulic cylinder 120 is pivotally attached to the distal end of the proximal leg 114 at the distal lift attachment 124. The boom 118 is shown in a lowered position; however, as the lift hydraulic cylinder 120 extends, the proximal leg 114 and the boom 118 are raised, and as the lift hydraulic cylinder 120 retracts, the proximal leg 114 and the boom 118 and the bucket 204 are lowered.

The distal leg 116 of the boom 118 is extendable from the proximal leg 114. The distal leg 116 is shown in the extended position corresponding to the boom extension hydraulic cylinder 126 being in the extended position, and both the extension shaft 106 and an extension cylinder piston rod 104 in extended positions.

The proximal end of the boom extension hydraulic cylinder 126 is attached to the proximal end of the proximal leg 114 at a proximal extension attachment 128. The distal end of the boom extension hydraulic cylinder 126 is attached to the proximal end of the distal leg 116 at the distal extension attachment 130.

The distal leg 116 includes a tilt hydraulic cylinder 132 which controls the tilt angle of an accessory, such as the bucket 204, the accessory being attached to and supported by the accessory support end 140. The tilt hydraulic cylinder 132 is pivotally attached to the proximal end of the distal leg 116 by a proximal tilt attachment 134, and also is pivotally attached to the accessory support end 140 by a distal tilt attachment 136 (shown in FIG. 1A).

With reference to FIG. 3, a perspective front and side view is shown of the front-end loader 100, having the support structure 102 mounted on the tractor 302. The front-end loader 100 includes, as an accessory, the bucket 204. The front-end loader 100 and the bucket 204 are shown in a lowered position, having each lift hydraulic cylinder 120 in the retracted position. Also, each boom 118 (shown in FIG. 1A) is in the retracted position, having each boom extension hydraulic cylinder 126 and each self-leveling cylinder 144 in the retracted position, and having each extension shaft 106 (shown in FIG. 1B) of the distal leg 116 fully retracted into the proximal leg receptacle 908 (shown in FIG. 9A) of the proximal leg 114. Each boom 118 of the two booms is attached to a cross member 202 configured to hold the two booms at a fixed distance apart and to provide structural support for the front-end loader 100.

The tractor 302 includes two rear wheels 304 and two front wheels 306. In this embodiment, the distal leg 116 extends from the proximal leg 114 at a boom legs angle 138 of 105 to 135 degrees (shown in FIG. 1A) to prevent each distal leg 116 from striking against each of the front wheels 306 (or other parts of the tractor 302) when the two booms are in the lowered position.

In some embodiments, the two rear wheels 304 can include conventional wheel weights (not shown) attached to the rear wheels 304 to provide additional counter weight for added stability, and to counter-balance the weight of the front-end loader 100 and the weight of an accessory attached to the accessory support end 140, such as the bucket 204.

In some embodiments, the accessory support end 140 is configured to attach to one of: the bucket 204, pallet forks 1202 (shown in FIG. 12), hay forks (not shown), and bale spears (not shown).

Figure 4:
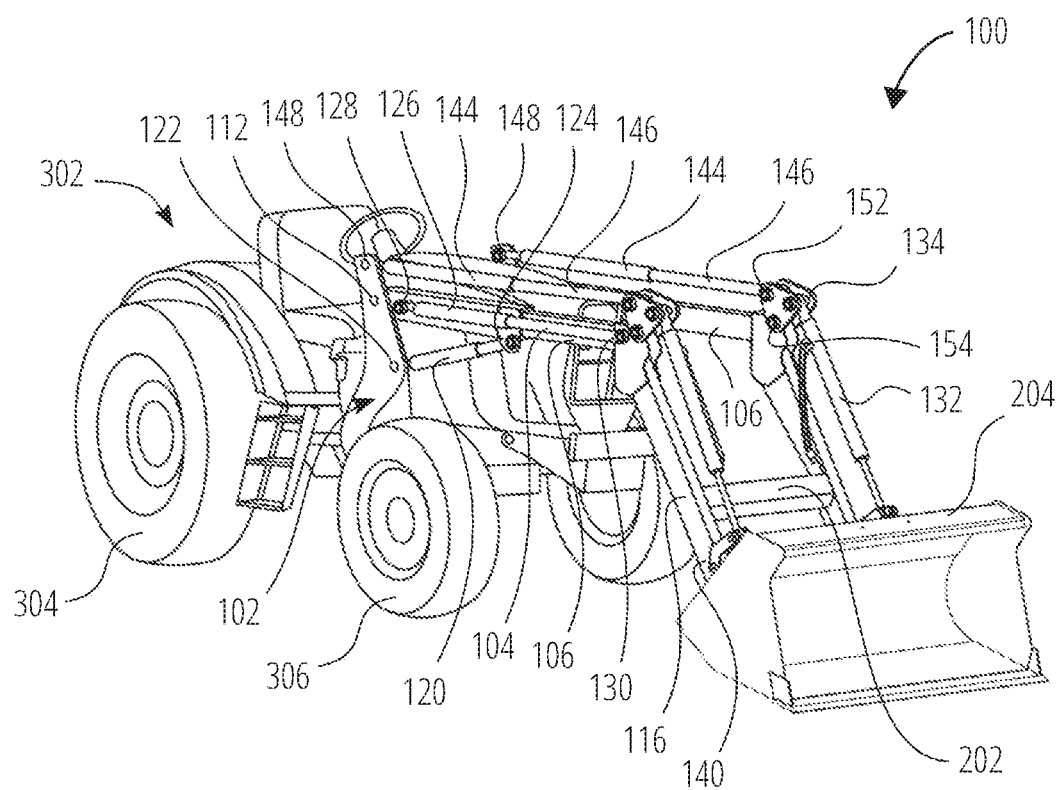
FIG. 4 is a perspective front and side view of the front-end loader mounted on the tractor and attached to a bucket accessory, showing the front-end loader and the bucket in a lowered position, having each lift hydraulic cylinder in the retracted position, each boom extension hydraulic cylinder in the extended position, having the extension shaft of each distal leg fully extended from the receptacle of the proximal leg of each boom, thereby extending the forward reach of each boom, and having each self-leveling cylinder in the extended position.

With reference to FIG. 4, a perspective front and side view is shown of the front-end loader 100, having the support structure 102 mounted on the tractor 302. The front-end loader 100 includes, as an accessory, the bucket 204. The front-end loader 100 and the bucket 204 are shown in a lowered position, having each lift hydraulic cylinder 120 in the retracted position. Also, each boom 118 (shown in FIG. 1A) is in the extended position, having each boom extension hydraulic cylinder 126 and each self-leveling cylinder 144 in the extended position, and having the extension shaft 106 of each distal leg 116 fully extended from the proximal leg receptacle 908 (shown in FIG. 9A) of the proximal leg 114.

The extension cylinder piston rod 104 of each boom extension hydraulic cylinder 126 is extended, and the self-leveling cylinder piston rod 146 of each self-leveling cylinder 144 is extended, providing extended reach for the front-end loader 100 bucket 204.

Each boom 118 (shown in FIG. 1A) of the two booms is attached to a cross member 202 configured to hold the two booms at a fixed distance apart and to provide structural support for the front-end loader 100.

The tractor 302 includes two rear wheels 304 and two front wheels 306, and in this embodiment, the distal leg 116 extends from the proximal leg 114 at a boom legs angle 138 of 105 to 135 degrees (shown in FIG. 1A) to prevent each distal leg 116 from striking against the front wheels 306 (or other parts of the tractor 302) when the two booms are in the lowered position.

In some embodiments, the two rear wheels 304 can include conventional wheel weights (not shown) attached to the rear wheels 304 to provide additional counter weight for added stability, and to counter-balance the weight of the front-end loader 100 and the weight of an accessory attached to the accessory support end 140, such as the bucket 204.

In this embodiment, the boom extension hydraulic cylinder 126 extends each boom 118 by 2 to 4 feet.

Figure 5:
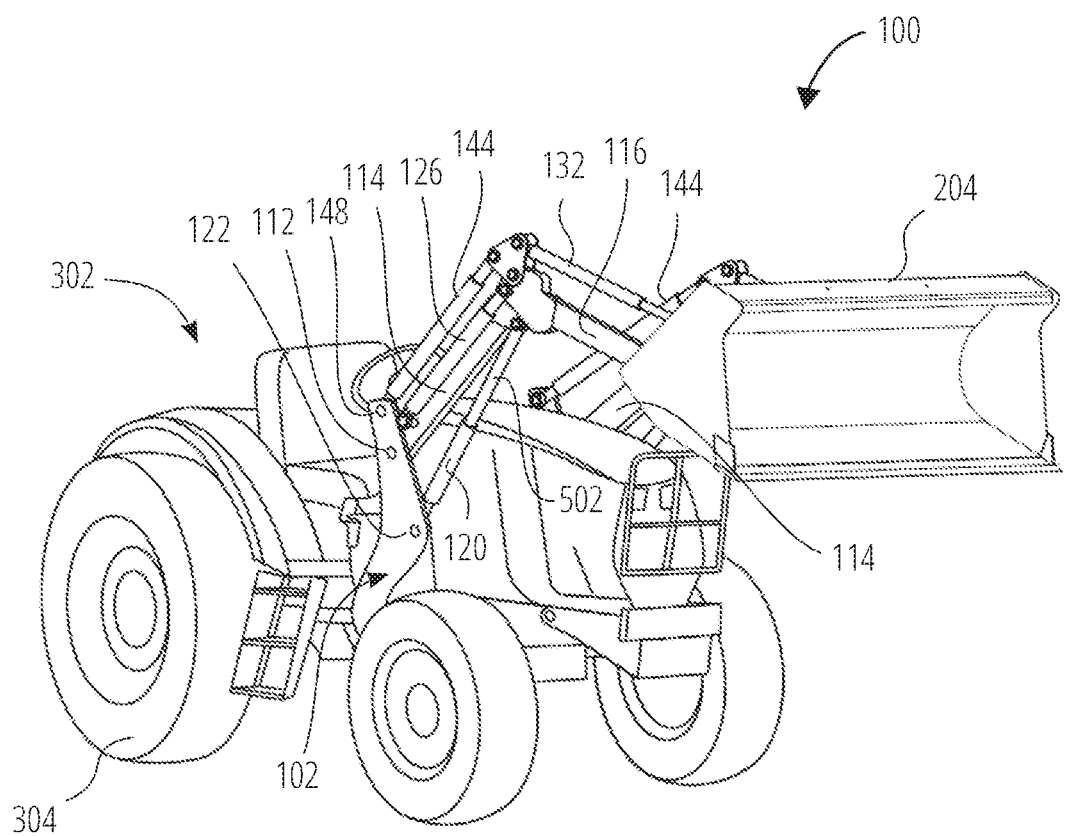
FIG. 5 is a perspective front and side view of the front-end loader mounted on the tractor and attached to the bucket accessory, showing the front-end loader and the bucket in a raised position, having each lift hydraulic cylinder in the extended position, each boom extension hydraulic cylinder in the retracted position, having the extension shaft of each distal leg fully retracted into the receptacle of the proximal leg of each boom, and having each self-leveling cylinder in the retracted position.

With reference to FIG. 5, a perspective front and side view is shown of the front-end loader 100, having the support structure 102 mounted on the tractor 302. The front-end loader 100 includes as an accessory the bucket 204. The bucket 204 is in a raised position, having the lift cylinder piston rod 502 of each lift hydraulic cylinder 120 in the extended position, and each proximal leg 114 in the raised position. Each boom extension hydraulic cylinder 126 and each self-leveling cylinder 144 are in the retracted position, and therefore the two booms are retracted (not extended).

Figure 6:
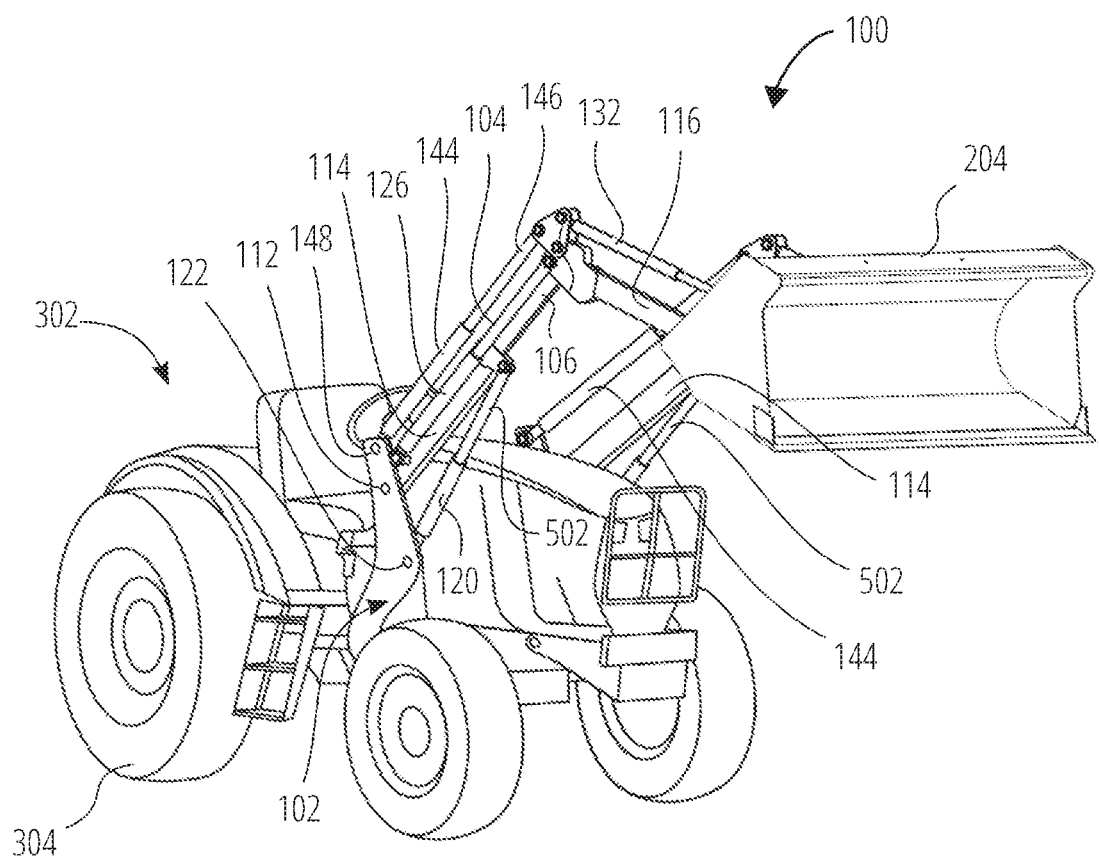
FIG. 6 is a perspective front and side view of the front-end loader mounted on the tractor and attached to the bucket accessory, showing the front-end loader and the bucket in a raised position, having each lift hydraulic cylinder in the extended position, each boom extension hydraulic cylinder in the extended position, having the extension shaft of each distal leg fully extended from the receptacle of the proximal leg of each boom, thereby extending the height and reach of each boom, and having each self-leveling cylinder in the extended position.

With reference to FIG. 6, a perspective front and side view is shown of the front-end loader 100, having the support structure 102 mounted on the tractor 302. The front-end loader 100 includes the bucket 204 accessory shown in a raised position. Each lift cylinder piston rod 502 of each lift hydraulic cylinder 120 in the extended position, and therefore each proximal leg 114 is in the raised position.

To further raise and extend the bucket 204, each boom extension hydraulic cylinder 126 is in the extended position, having each extension shaft 106 of the distal leg 116 fully extended from the proximal leg receptacle 908 (shown in FIG. 9A) of the proximal leg 114 of each boom 118 (shown in FIG. 1A). Also, the extension cylinder piston rod 104 of each boom extension hydraulic cylinder 126 is extended, and the self-leveling cylinder piston rod 146 of each self-leveling cylinder 144 is extended, providing extended reach for the front-end loader 100 bucket 204.

Figure 16A:
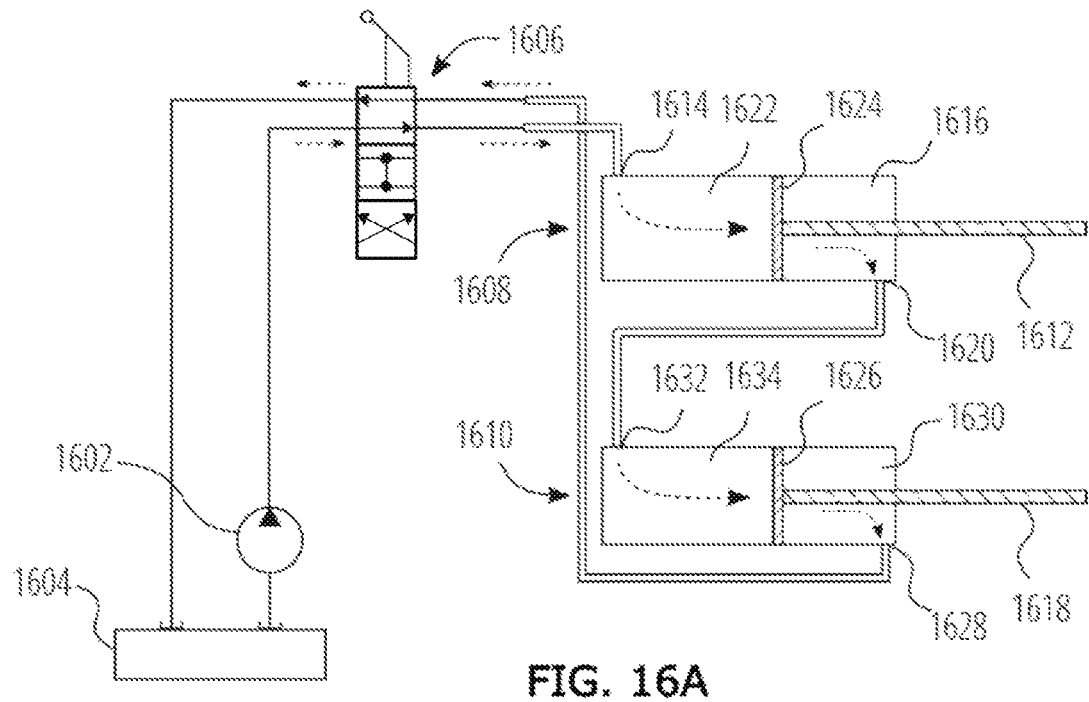
FIG. 16A is a hydraulic circuit diagram of a series hydraulic circuit, including the hydraulic reservoir, the hydraulic pump, one hydraulic control valve, and having a first hydraulic cylinder and a second hydraulic cylinder configured as a series hydraulic circuit, showing the hydraulic control valve in the open forward flow position and both the first and second upper hydraulic cylinder piston rods extending.

The boom extension hydraulic cylinder 126 and the self-leveling cylinder 144 are configured as a series hydraulic circuit (see FIG. 16A, FIG. 16B, and FIG. 17) such that the boom extension hydraulic cylinder 126 and the self-leveling cylinder 144 each co-extend by a substantially equal distance, and the boom extension hydraulic cylinder 126 and the self-leveling cylinder 144 each co-retract by a substantially equal distance.

In some embodiments, the two rear wheels 304 include conventional wheel weights (not shown) to provide additional counter weight for added stability, and to counterbalance the weight of the front-end loader 100 and the weight of an accessory, such as the bucket 204. These conventional wheel weights added to the two rear wheels 304 can provide an especially important counter-balance when the boom extension hydraulic cylinder 126 of each boom 118 (shown in FIG. 1A) are in the extended position, as shown.

In some embodiments, the boom extension hydraulic cylinder 126 of each boom 118 is configured to extend and retract each boom 118 AFTER the lift hydraulic cylinder 120 has raised each boom 118 (shown in FIG. 1A) to a raised position.

Figure 7A:
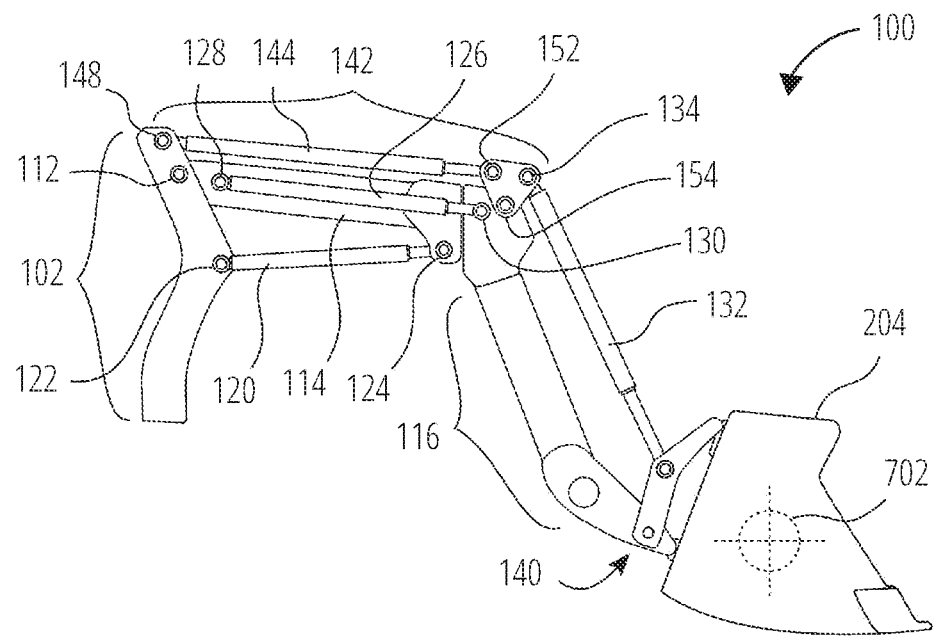
FIG. 7A is a side view of the front-end loader attached to the bucket accessory showing the bucket in a lowered position, the lift hydraulic cylinder in the retracted position, the boom extension hydraulic cylinder in the retracted position, also having the extension shaft of the distal leg fully retracted into the receptacle of the proximal leg of the boom, and the self-leveling linkage maintaining the bucket at a level bucket angle.

With reference to FIG. 7A, a side view of a front-end loader 100 is shown having an extendable boom 118 (shown in FIG. 1A), including a proximal leg 114 and distal leg 116, and the bucket 204 accessory. The distal leg 116 of the boom 118 is extendable from the proximal leg 114. In this view, the boom extension hydraulic cylinder 126 and the self-leveling cylinder 144 are shown in the retracted position, and therefore the distal leg 116 is in the retracted position with respect to the proximal leg 114.

The lift hydraulic cylinder 120 is in the retracted position, corresponding to the distal leg 116 accessory support end 140 and the attached bucket 204 being in a lowered position.

The bucket tilt angle 702 is shown at a level tilt position.

Figure 7B:
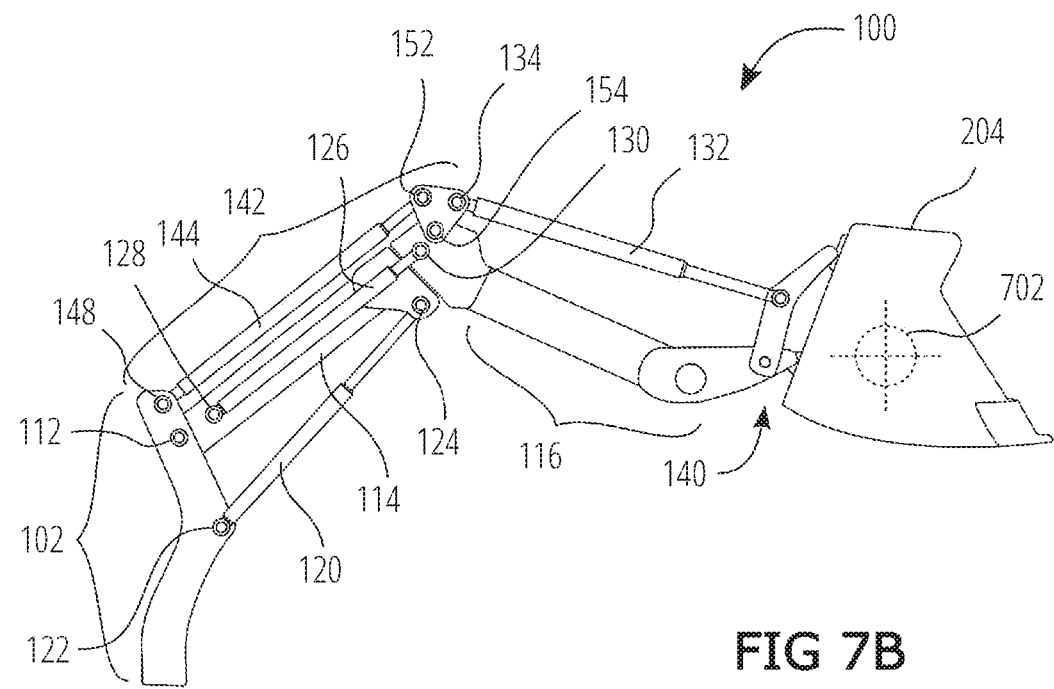
FIG. 7B is a side view of the front-end loader of FIG. 7A, showing the bucket in a raised position, the lift hydraulic cylinder in the extended position, and the self-leveling linkage maintaining the raised bucket at the same level bucket angle as for the lowered bucket in FIG. 7A.

With reference to FIG. 7B, a side view of a front-end loader 100 and the bucket 204 of FIG. 7A are shown. The lift hydraulic cylinder 120 is in the extended position, corresponding to the distal leg 116 accessory support end 140 and the attached bucket 204 being in the raised position.

The bucket tilt angle 702 can be changed with the tilt hydraulic cylinder 132. The tilt hydraulic cylinder 132 is configured to control the tilt angle of an accessory, such as a bucket 204.

As the lift hydraulic cylinder 120 raises the distal leg 116 and the bucket 204 to the raised position, the self-leveling linkage 142 maintains a constant bucket tilt angle 702. Accordingly, the raised bucket 204 is maintained at the same bucket tilt angle 702 as for the lowered bucket 204 position shown in FIG. 7A.

The bucket tilt angle 702 is shown at a level tilt position. Because the self-leveling linkage 142 maintains a constant bucket tilt angle 702, no matter how high or low the bucket 204 is raised, the bucket tilt angle 702 remains the same. Accordingly, the bucket tilt angle 702 remains invariant.

The boom extension hydraulic cylinder 126 is configured in a series hydraulic circuit (shown in FIG. 16A and FIG. 16B) with the self-leveling cylinder 144, the self-leveling cylinder 144 being included in the self-leveling linkage 142. This series hydraulic circuit integrates the self-leveling hydraulics with the extension hydraulics of the extendable boom 118 (shown in FIG. 1). The self-leveling cylinder 144 and the boom extension hydraulic cylinder 126 are integrated and simultaneously work together to preserve the self-leveling function while the extendable boom 118 is being extended and retracted.

If the bucket tilt angle 702 is adjusted independently by the tilt hydraulic cylinder 132 to a alternative bucket tilt angle 702, such as 30 degrees, and the lift hydraulic cylinder 120 is then extended or retracted to raise or lower the distal leg 116 and the bucket 204 to the raised position or the lowered position, the self-leveling linkage 142 maintains a constant bucket tilt angle 702 at 30 degrees. It does not matter what the bucket tilt angle 702 is, as the distal leg 116 and the bucket 204 are raised and lowered, the self-leveling linkage 142 will maintain the bucket tilt angle 702 at a constant angle, such as 30 degrees. This is why the front-end loader 100 is called "self-leveling".

Figure 8A:
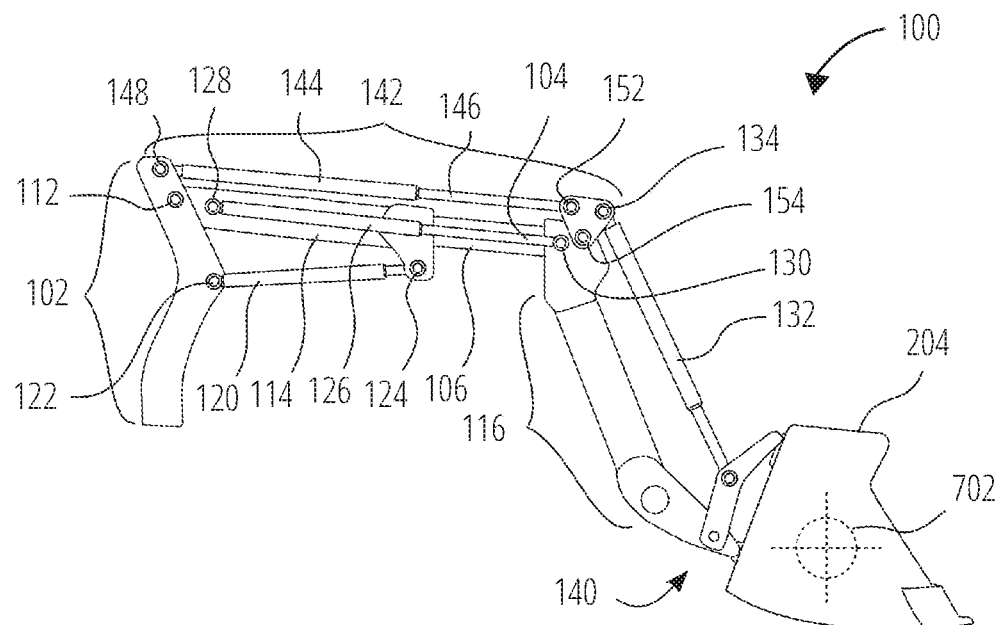
FIG. 8A is a side view of the front-end loader attached to the bucket accessory showing the bucket in a lowered position, the lift hydraulic cylinder in the retracted position, the boom extension hydraulic cylinder in the extended position, also having the extension shaft of the distal leg partially extended from the receptacle of the proximal leg of the boom, and the self-leveling linkage maintaining the bucket at a level bucket angle.

With reference to FIG. 8A, a side view of a front-end loader 100 is shown having an extendable boom 118 (shown in FIG. 1A), including a proximal leg 114 and distal leg 116, and the bucket 204 accessory. The distal leg 116 of the boom 118 is extendable from the proximal leg 114. In this view, the boom extension hydraulic cylinder 126 and the self-leveling cylinder 144 are shown in the extended position, and therefore the distal leg 116 is in the extended position with respect to the proximal leg 114.

The lift hydraulic cylinder 120 is in the retracted position, corresponding to the distal leg 116 accessory support end 140 and the attached bucket 204 being in a lowered position.

The bucket tilt angle 702 is shown in a level tilt position.

Figure 8B:
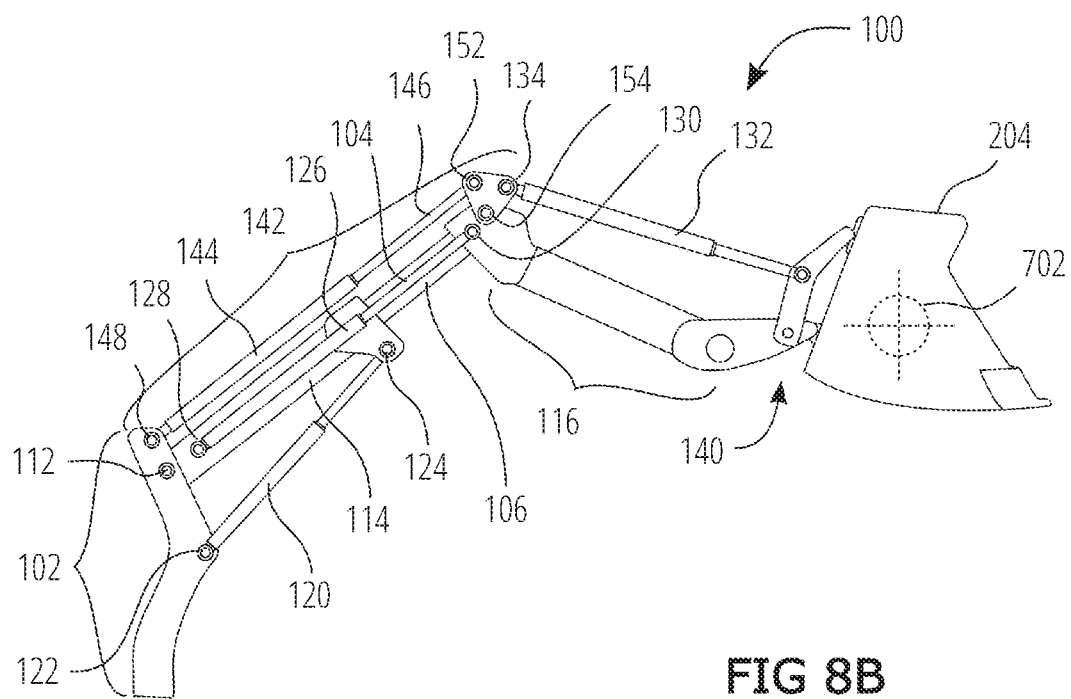
FIG. 8B is a side view of the front-end loader of FIG. 8A, showing the bucket in a raised position, the lift hydraulic cylinder in the extended position, and the self-leveling linkage maintaining the raised bucket at the same level bucket angle as for the lowered bucket in FIG. 8A.

With reference to FIG. 8B, a side view of a front-end loader 100 and the bucket 204 of FIG. 8A are shown. The lift hydraulic cylinder 120 is in the extended position, corresponding to the distal leg 116 accessory support end 140 and the attached bucket 204 being in a raised position.

The bucket tilt angle 702 can be changed with the tilt hydraulic cylinder 132. The tilt hydraulic cylinder 132 is configured to control the tilt angle of an accessory, such as a bucket 204.

As the lift hydraulic cylinder 120 raises the distal leg 116 and the bucket 204 to the raised position, the self-leveling linkage 142 maintains a constant bucket tilt angle 702. Accordingly, the raised bucket 204 is maintained at the same bucket tilt angle 702 as for the lowered bucket 204 position shown in FIG. 7A.

The bucket tilt angle 702 is shown at a level tilt position. Because the self-leveling linkage 142 maintains a constant bucket tilt angle 702, no matter how high or low the bucket 204 is raised, the bucket tilt angle 702 remains the same. Accordingly, the bucket tilt angle 702 remains invariant.

The boom extension hydraulic cylinder 126 is configured in a series hydraulic circuit (shown in FIG. 16A and FIG. 16B) with the self-leveling cylinder 144, the self-leveling cylinder 144 being included in the self-leveling linkage 142. This series hydraulic circuit integrates the self-leveling hydraulics with the extension hydraulics of the extendable boom 118 (shown in FIG. 1). The self-leveling cylinder 144 and the boom extension hydraulic cylinder 126 are integrated and simultaneously work together to preserve the self-leveling function while the extendable boom 118 is being extended and retracted.

If the bucket tilt angle 702 is adjusted independently by the tilt hydraulic cylinder 132 to a alternative bucket tilt angle 702, such as 30 degrees, and the lift hydraulic cylinder 120 is then extended or retracted to raise or lower the distal leg 116 and the bucket 204 to the raised position or the lowered position, the self-leveling linkage 142 maintains a constant bucket tilt angle 702 at 30 degrees. It does not matter what the bucket tilt angle 702 is, as the distal leg 116 and the bucket 204 are raised and lowered, the self-leveling linkage 142 will maintain the bucket tilt angle 702 at a constant angle, such as 30 degrees.

Figure 9A:
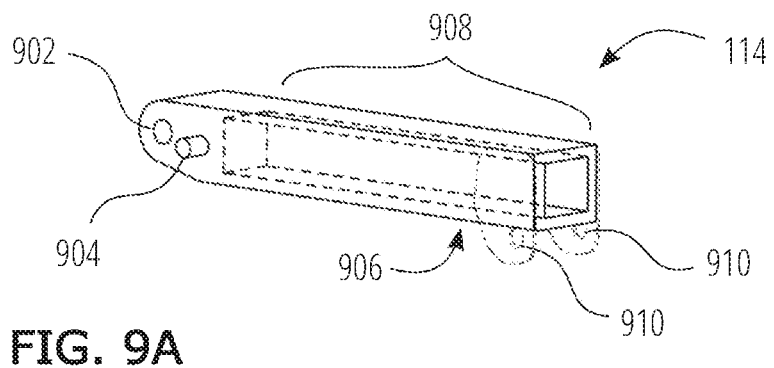
FIG. 9A is an isometric side view of the proximal leg, showing a proximal leg attachment hole configured to attach to the upper attachment portion of the support structure, a proximal leg attachment pin configured to attach to the proximal end of the boom extension hydraulic cylinder, two lift cylinder attachment holes configured to attach the proximal leg to the distal end of the lift hydraulic cylinder, and hidden lines showing the proximal leg receptacle configured to receive the extension shaft of the distal leg.

With reference to FIG. 9A, an isometric side view is shown of the proximal leg 114, including a proximal leg attachment hole 902 configured to pivotally attach to the proximal leg pivot 112 (shown in FIG. 1A) at the upper attachment portion 110 of the support structure 102 (both shown in FIG. 1A). The proximal leg 114 also includes a proximal leg attachment pin 904 configured to support the proximal end of the boom extension hydraulic cylinder 126 (shown in FIG. 1A).

An extension end 906 of the proximal leg 114 includes a proximal leg receptacle 908 configured to receive and slidably support the extension shaft 106 Of the distal leg 116 (both shown in FIG. 9B), and two lift cylinder attachment holes 910 configured to receive the distal lift attachment 124 at the distal end of the lift hydraulic cylinder 120 (both shown in FIG. 1A).

Figure 9B:
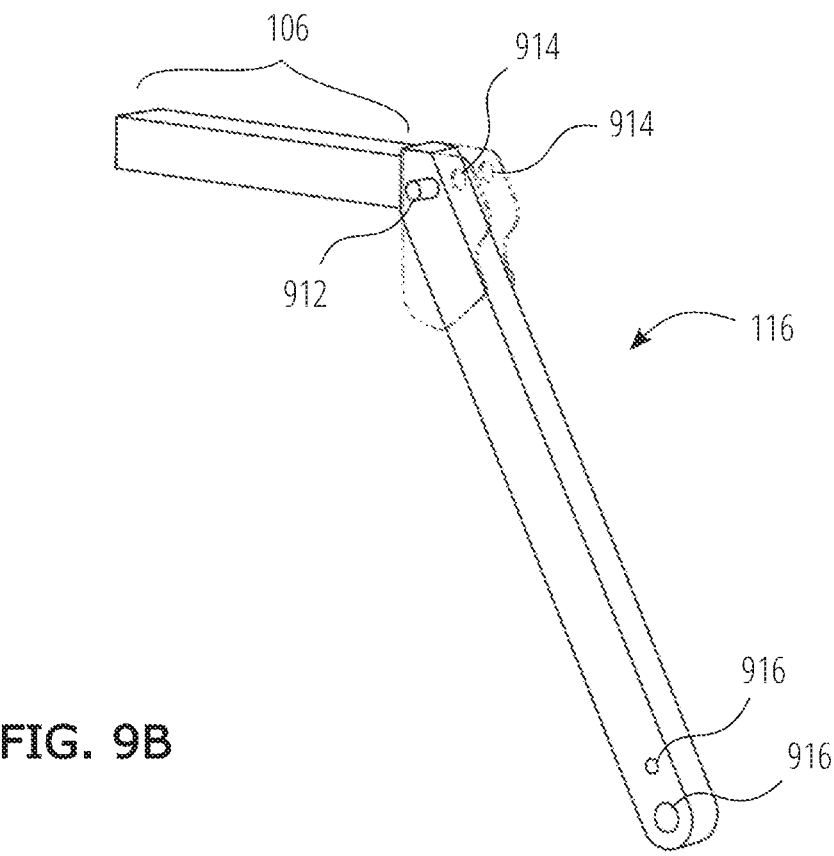
FIG. 9B is an isometric side view of the distal leg, showing the extension shaft, a distal leg attachment pin configured to attach to the distal end of the boom extension hydraulic cylinder, two attachment holes configured to attach to the linkage lower attachment of the self-leveling linkage, and two accessory attachment holes configured to attach to an accessory, such as the bucket accessory.

With reference to FIG. 9B, an isometric side view is shown of the distal leg 116, including a distal leg attachment pin 912 configured to support the distal end of the boom extension hydraulic cylinder 126 (shown in FIG. 1A), two tilt cylinder attachment holes 914 configured to receive the linkage lower attachment 154 of the linkage connector 150 (both shown in FIG. 1A), and accessory attachment holes 916 that are configured to receive and support the accessory support end 140 (shown in FIG. 1A).

Figure 10:
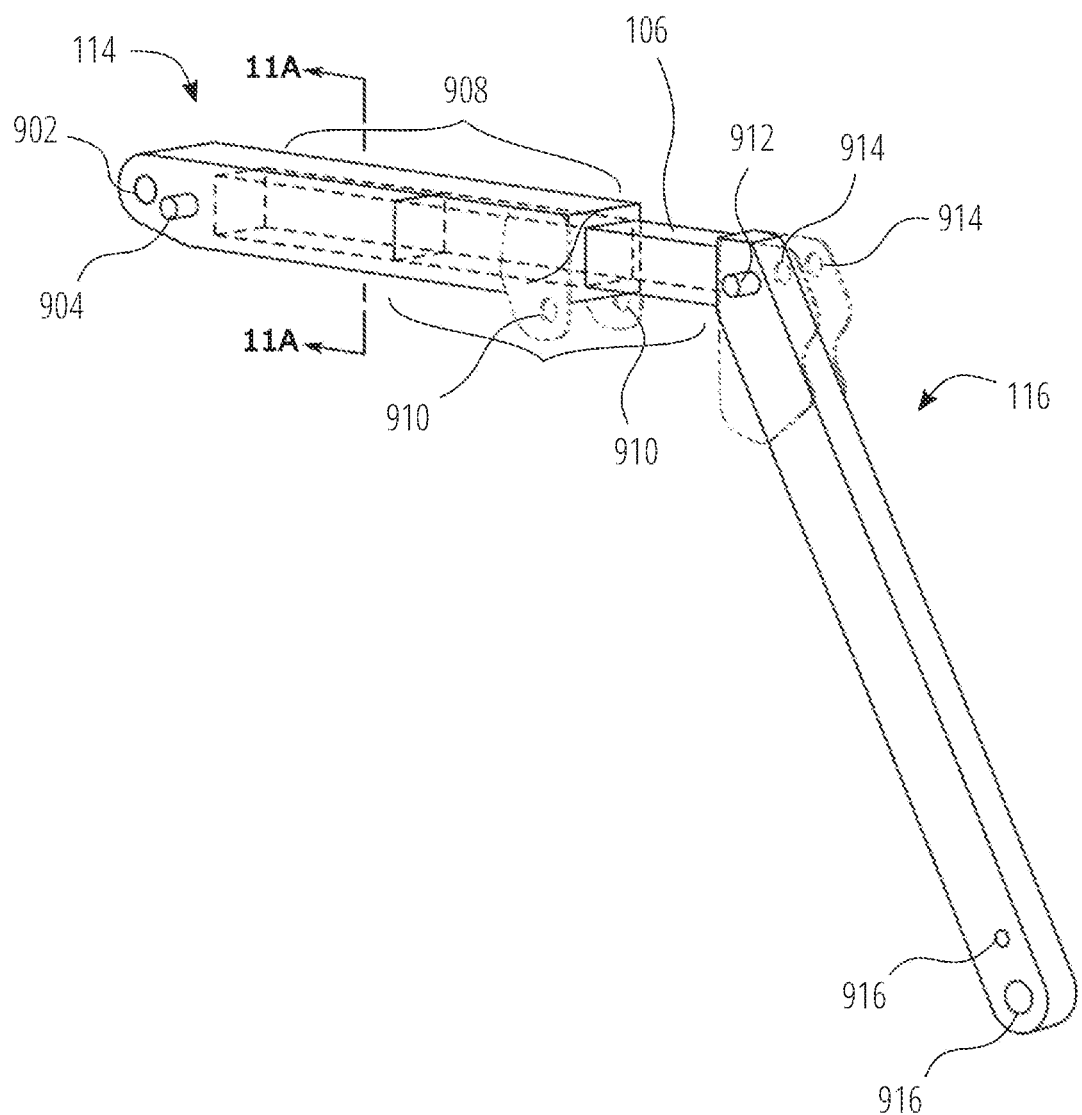
FIG. 10 is an isometric side view of the proximal leg and the distal leg, the proximal leg receptacle receiving and supporting the extension shaft of the distal leg, the extension shaft partially extended from the proximal leg.

With reference to FIG. 10, an isometric side view of the proximal leg 114 and the distal leg 116 is shown, with hidden lines showing the proximal leg receptacle 908 partially receiving and slidably supporting the extension shaft 106 of the distal leg 116.

Included on the proximal leg 114 is the proximal leg attachment hole 902 configured to pivotally attach to the proximal leg pivot 112 (shown in FIG. 1A). In addition, the proximal leg attachment pin 904 is configured to support the proximal end of the boom extension hydraulic cylinder 126 (shown in FIG. 1A). Also, two lift cylinder attachment holes 910 are configured to receive the distal lift attachment 124 at the distal end of the lift hydraulic cylinder 120 (shown in FIG. 1A).

The distal leg 116 includes the distal leg attachment pin 912 configured to support the distal end of the boom extension hydraulic cylinder 126 (shown in FIG. 1A). Two tilt cylinder attachment holes 914 are configured to receive the linkage lower attachment 154 of the linkage connector 150 (both shown in FIG. 1A), and accessory attachment holes 916 are configured to receive and support the accessory support end 140 (shown in FIG. 1A). The accessory support end 140 (shown in FIG. 1A) is configured to provide support for various accessories, such as the bucket 204 (shown in FIG. 1B).

Figure 11A:
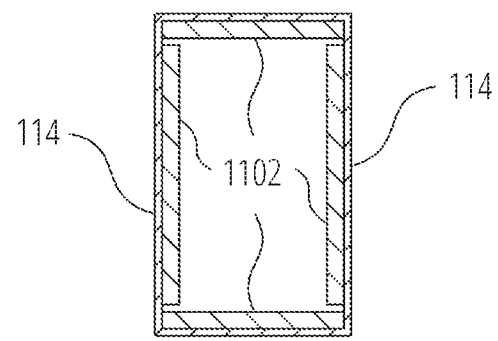
FIG. 11A is a cross sectional view of the proximal leg, showing four wear pads configured to slidably support the extension shaft of the distal leg.

With reference to FIG. 11A, a cross sectional view of the proximal leg 114 is shown, showing four wear pads 1102 that, in this embodiment, are included within the proximal leg receptacle 908 (shown in FIG. 9A) of the proximal leg 114. The wear pads 1102 are configured to slidably support the extension shaft 106 of the distal leg 116 (both shown in FIG. 1B).

Figure 11B:
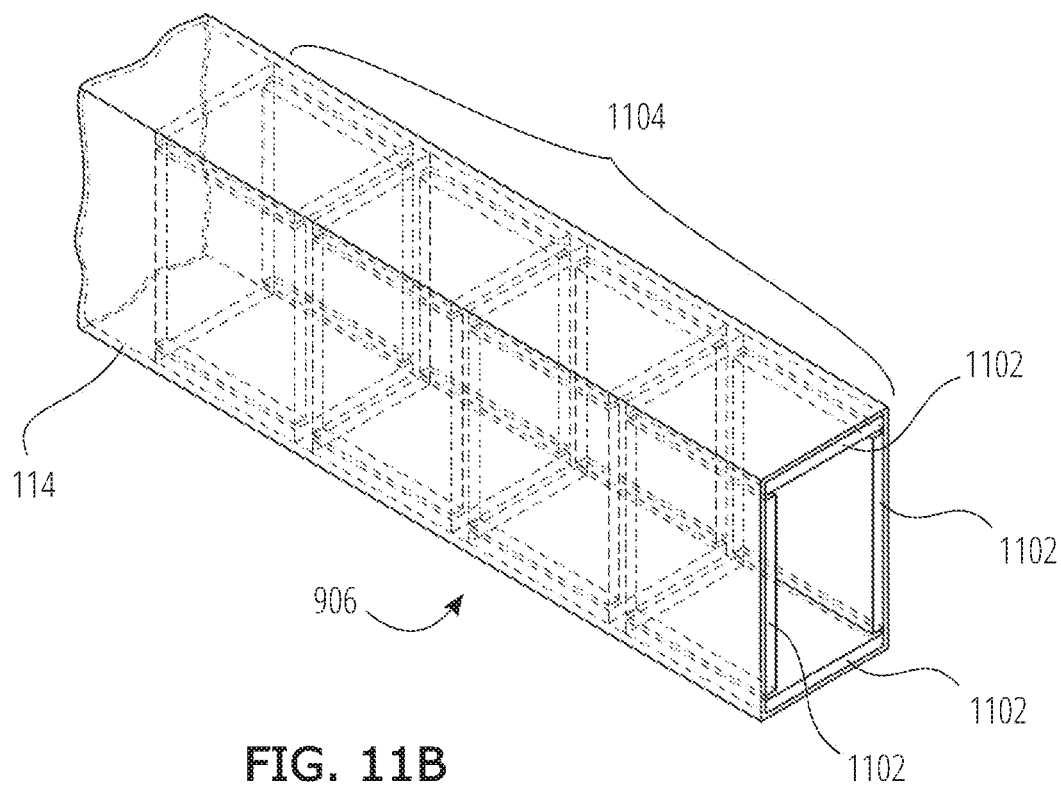
FIG. 11B is an isometric view of the distal end of the proximal leg, also showing a hidden line view of a plurality of wear pads lining the proximal leg receptacle.

With reference to FIG. 11B, an isometric view of the distal end of the proximal leg 114 is shown, also showing a hidden line view of a plurality of wear pads 1104 lining the proximal leg receptacle 908 (shown in FIG. 9A). In this embodiment, the plurality of wear pads 1104 are configured to slidably support the extension shaft 106 of the distal leg 116 (shown in FIG. 9B).

In this embodiment, the extension end 906 of the proximal leg 114 includes the proximal leg receptacle 908 (shown in FIG. 9A) within the proximal leg 114 that includes a plurality of wear pads 1104 to slidably support the extension shaft 106 of the distal leg 116 (both shown in FIG. 9B) to provide a long service life.

Figure 12:
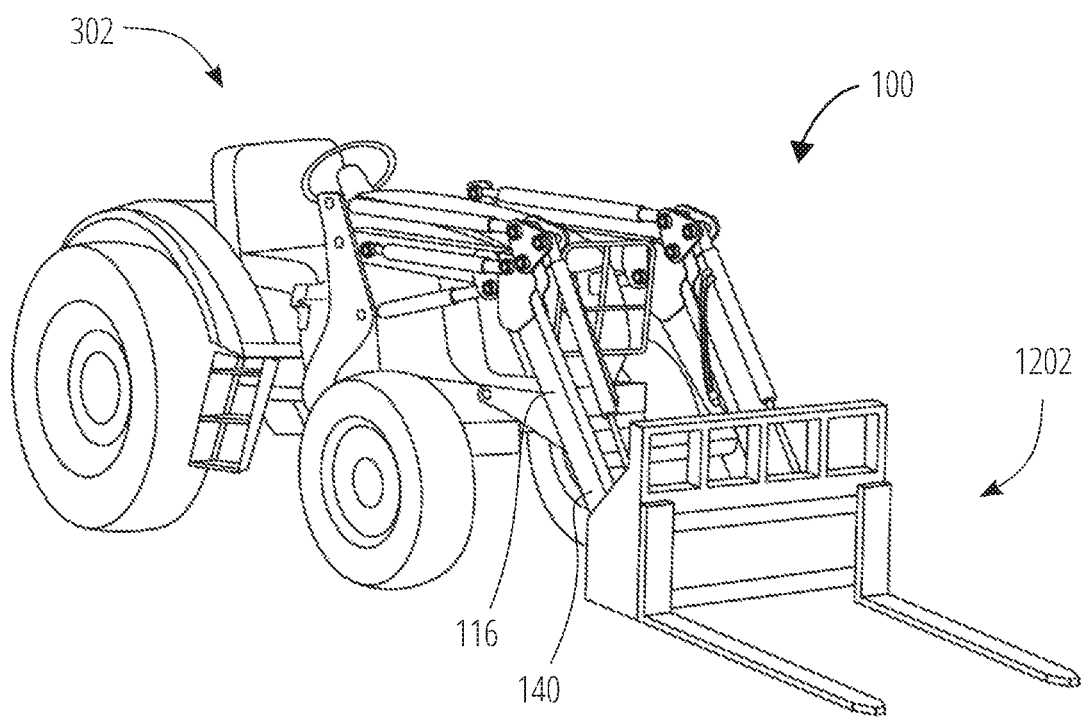
FIG. 12 is a perspective front and side view of the front-end loader mounted on the tractor and attached to a pallet forks accessory, showing the front-end loader and the pallet forks in a lowered position, having each lift hydraulic cylinder in the retracted position, each boom extension hydraulic cylinder in the retracted position, and the extension shaft of each distal leg fully retracted into the proximal leg receptacle of each boom.

With reference to FIG. 12, a perspective front and side view is shown of the front-end loader 100 mounted on the tractor 302, including pallet forks 1202 attached to the accessory support end 140 of the distal leg 116 of the front-end loader 100.

Figure 13A:
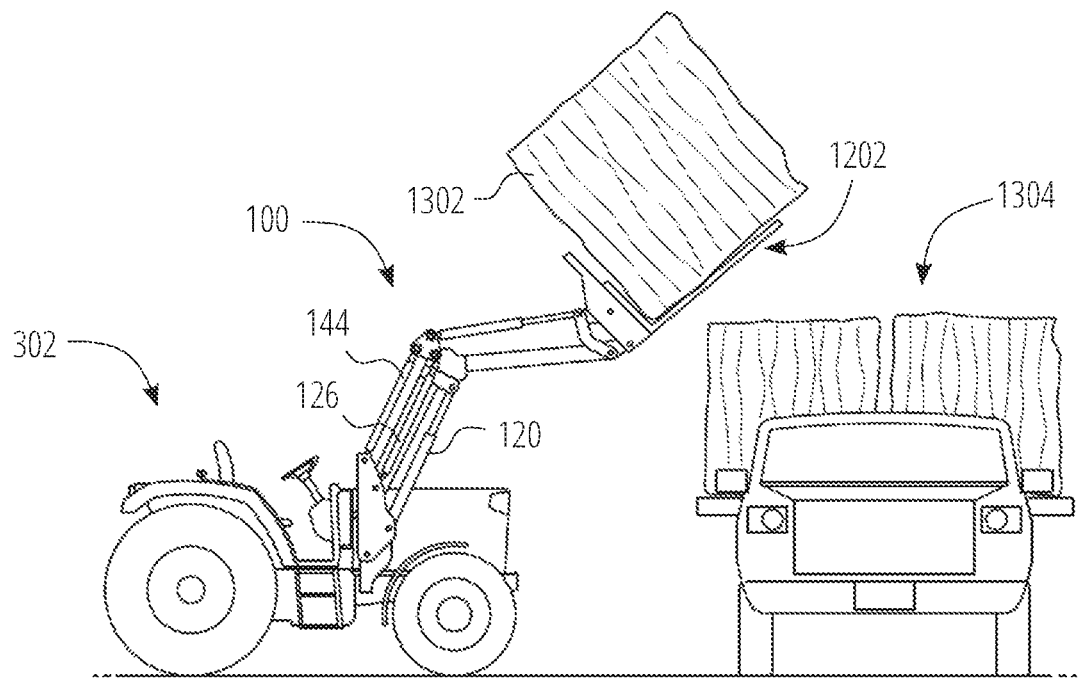
FIG. 13A is a side view of a partially loaded truck and the front-end loader mounted on the tractor, showing the pallet forks accessory in a raised position, although not at an adequate height to place the pallet forks payload upon the truck, also showing the front-end loader having each lift hydraulic cylinder in the extended position, each boom extension hydraulic cylinder in the retracted position, and the extension shaft of each distal leg being fully retracted into the receptacle of the proximal leg of each boom, and having each self-leveling cylinder in the retracted position.

With reference to FIG. 13A, a side view is shown of the tractor 302, including the front-end loader 100 attached to pallet forks 1202. The lift hydraulic cylinder 120 is in the extended position, and the pallet forks 1202 are raised, however since the boom extension hydraulic cylinder 126 and the self-leveling cylinder 144 are in the retracted position, each boom 118 (shown in FIG. 1A) is not extended, and a bale of material 1302 is not raised high enough to be successfully placed on a truck 1304.

Figure 13B:
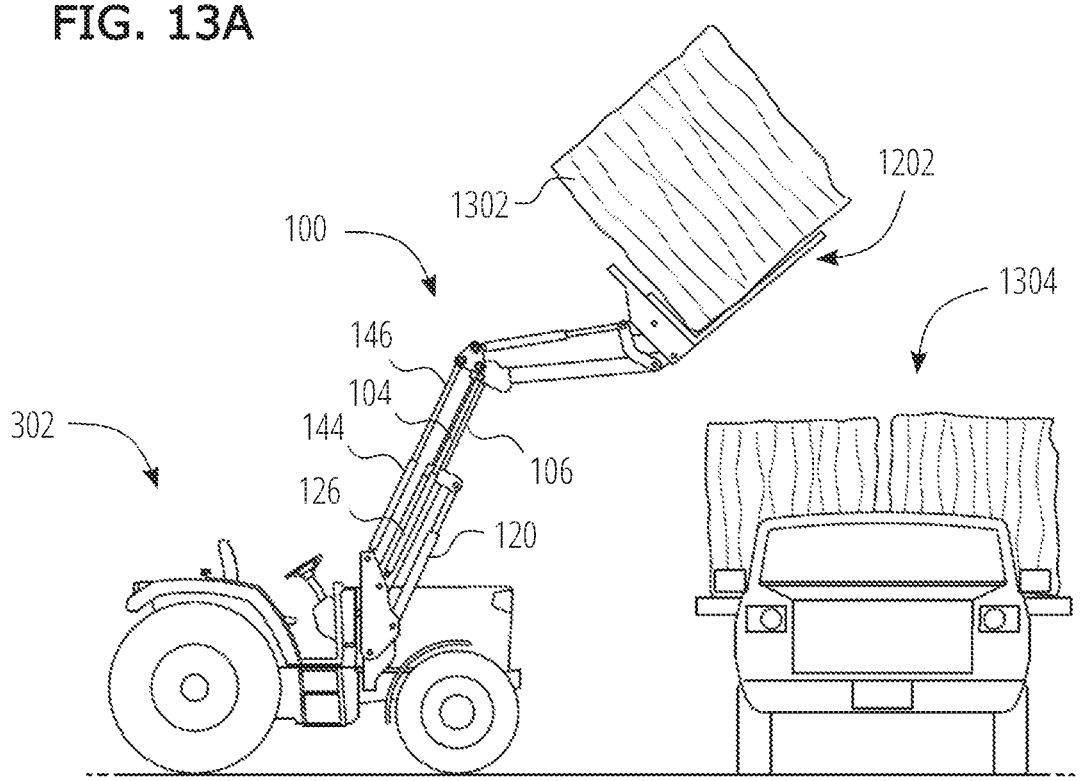
FIG. 13B is a side view of the partially loaded truck and the front-end loader of FIG. 13A, having the pallet forks accessory in the raised position, and showing each boom extension hydraulic cylinder in the extended position, thereby bringing the pallet forks to a sufficient height and reach so as to place the pallet forks payload upon the truck, also showing the extension shaft of each distal leg being fully extended from the receptacle of the proximal leg of each boom, and having each self-leveling cylinder in the extended position.

With reference to FIG. 13B, a side view is shown of the tractor 302, including the front-end loader 100 attached to pallet forks 1202. The lift hydraulic cylinder 120 is in the extended position, and the pallet forks 1202 are raised. Because the boom extension hydraulic cylinder 126 and the self-leveling cylinder 144 are in the extended position (having the extension cylinder piston rod 104, the self-leveling cylinder piston rod 146, and the extension shaft 106 in the extended position), each boom 118 (shown in FIG. 1A) is extended, and therefore the bale of material 1302 is raised high enough to be successfully placed on the truck 1304.

Figure 14A:
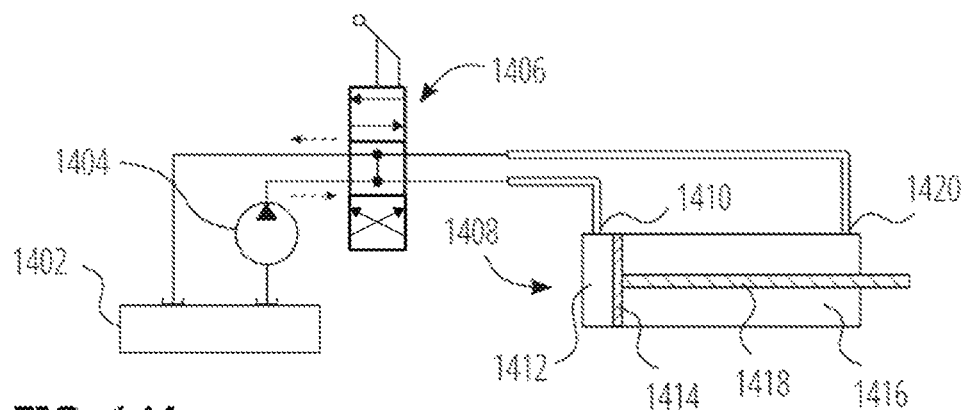
FIG. 14A is a hydraulic circuit diagram of a hydraulic circuit including a hydraulic reservoir, a hydraulic pump, a hydraulic control valve, and a hydraulic cylinder, showing the hydraulic control valve in the neutral position, and the hydraulic cylinder piston rod in a static position.

With reference to FIG. 14A, a hydraulic circuit diagram is shown of a hydraulic circuit configured to control one hydraulic cylinder 1408. A hydraulic reservoir 1402 holds a reservoir of hydraulic fluid that is pumped up to a high pressure on the valve side of a hydraulic pump 1404. A hydraulic control valve 1406 is configured in a neutral position, and the hydraulic fluid is simply returned to the hydraulic reservoir 1402, having performed no work on the hydraulic cylinder 1408. In addition, since the hydraulic control valve 1406 is in a neutral position, there is no hydraulic fluid flow at both a head port 1410 and a rod port 1420 of the hydraulic cylinder 1408, and due to the incompressibility of the hydraulic fluid, the volumes of a head fluid 1412 and a rod fluid 1416 remain constant, and a ram 1414 and a piston rod 1418 maintain a static position.

Figure 14B:
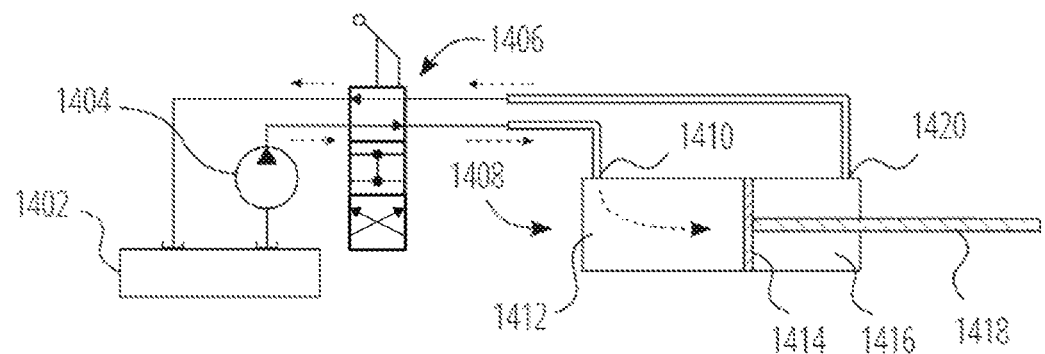
FIG. 14B is a hydraulic circuit diagram of the hydraulic circuit of FIG. 14A, showing the hydraulic control valve in the open forward flow position, and the hydraulic cylinder piston rod extending.

With reference to FIG. 14B, a hydraulic circuit diagram is shown of a hydraulic circuit configured to control one hydraulic cylinder 1408. The hydraulic reservoir 1402 holds a reservoir of hydraulic fluid that is pumped up to a high pressure on the valve side of the hydraulic pump 1404. The hydraulic control valve 1406 is configured in an open forward flow position, and therefore the high pressure hydraulic fluid flows through the hydraulic control valve 1406 and through the head port 1410 and into the head fluid 1412. Because the head fluid 1412 is at a higher pressure than the rod fluid 1416, the ram 1414 moves to the right, and in doing so expands the volume of the head fluid 1412, and at the same time the piston rod 1418 extends outward from the hydraulic cylinder 1408. Simultaneously, the rod fluid 1416 volume decreases and the rod fluid 1416 passes out of the rod port 1420, the hydraulic fluid returning back through the hydraulic control valve 1406 and returning to the hydraulic reservoir 1402.

Figure 14C:
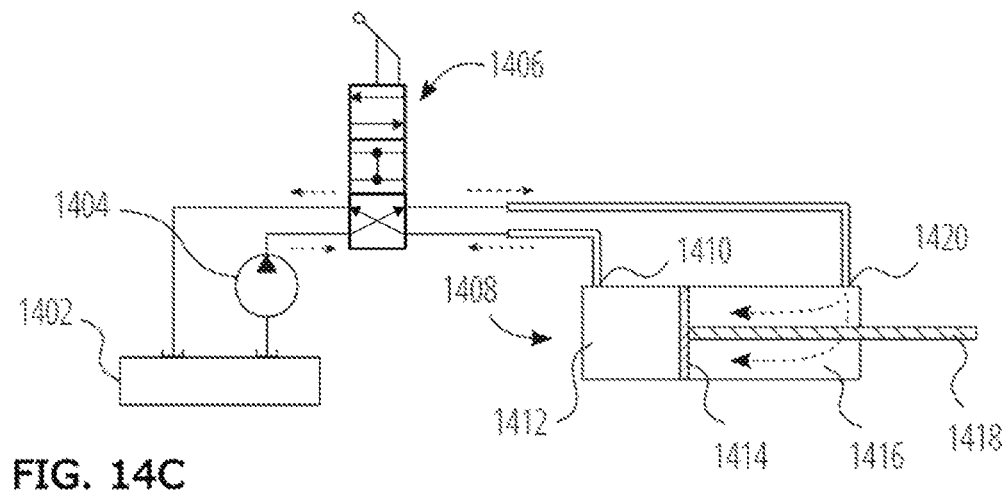
FIG. 14C is a hydraulic circuit diagram of the hydraulic circuit of FIG. 14A, showing the hydraulic control valve in the open reverse flow position, and the hydraulic cylinder piston rod retracting.

With reference to FIG. 14C, a hydraulic circuit diagram is shown of a hydraulic circuit configured to control one hydraulic cylinder 1408. The hydraulic reservoir 1402 holds a reservoir of hydraulic fluid that is pumped up to a high pressure on the valve side of the hydraulic pump 1404. The hydraulic control valve 1406 is configured in an open reverse flow position, and therefore the high pressure hydraulic fluid flows through the hydraulic control valve 1406 and through the rod port 1420 and into the rod fluid 1416. Because the rod fluid 1416 is at a higher pressure than the head fluid 1412, the ram 1414 moves to the left, and in doing so expands the volume of the rod fluid 1416, and at the same time the piston rod 1418 retracts inward into the hydraulic cylinder 1408. Simultaneously, the head fluid 1412 volume decreases and the head fluid 1412 passes out of the head port 1410, the hydraulic fluid returning back through the hydraulic control valve 1406 and returning to the hydraulic reservoir 1402.

Figure 15A:
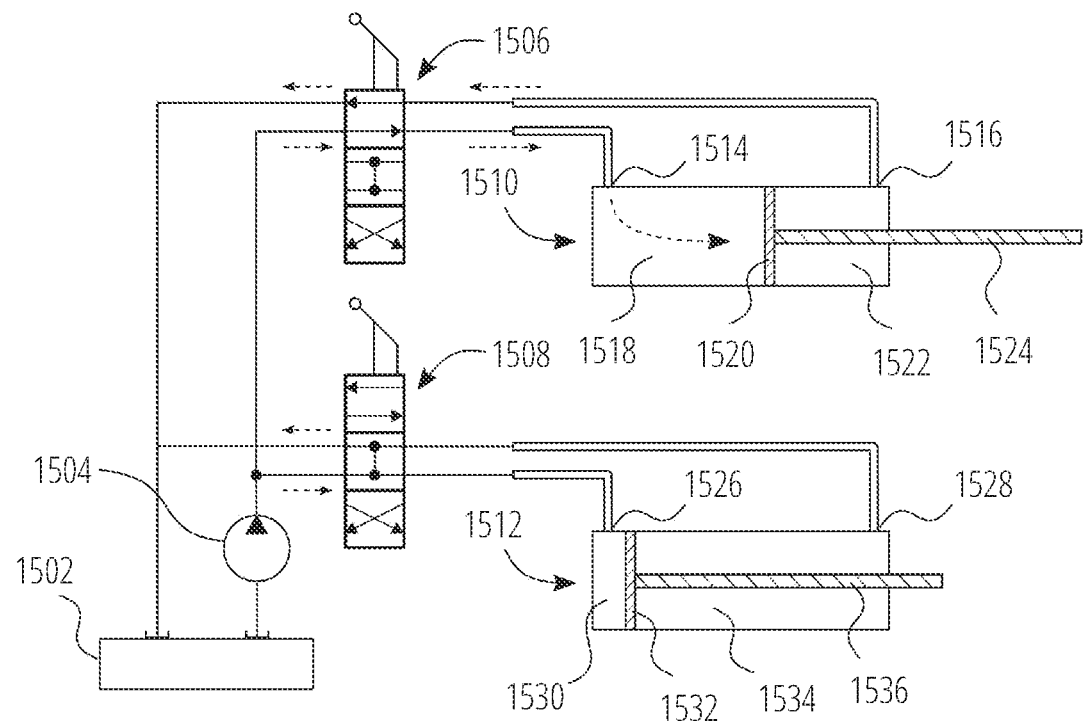
FIG. 15A is a hydraulic circuit diagram of a hydraulic circuit configured to control two hydraulic cylinders, including the hydraulic reservoir, the hydraulic pump, two hydraulic control valves, and two hydraulic cylinders, showing the upper hydraulic control valve in the open forward flow position and the upper hydraulic cylinder piston rod extending, and also showing the lower hydraulic control valve in the neutral position and the lower hydraulic cylinder piston rod in a static position.

With reference to FIG. 15A, a hydraulic circuit diagram is shown of a hydraulic circuit configured to control two hydraulic cylinders, a first hydraulic cylinder 1510 and a second hydraulic cylinder 1512.

The front-end loader 100 of the invention (shown in FIG. 1A) is an example of an application of four hydraulic cylinders: the lift hydraulic cylinder 120, the boom extension hydraulic cylinder 126, the self-leveling cylinder 144, and the tilt hydraulic cylinder 132 (each shown in FIG. 1A). It is understood that the description herein of the basic operation of two hydraulic cylinders can be similarly extended to a hydraulic circuit with more than two hydraulic cylinders, such as are included in the front-end loader 100 of the invention.

A hydraulic reservoir 1502 holds a reservoir of hydraulic fluid that is pumped up to a high pressure by a hydraulic pump 1504.

A first hydraulic control valve 1506 is configured in an open forward flow position, and therefore high pressure hydraulic fluid flows through the first hydraulic control valve 1506 and through a first head port 1514 and into to a first head fluid 1518. Because the first head fluid 1518 is at a higher pressure than a first rod fluid 1522, a first ram 1520 moves to the right, and in doing so expands the volume of the first head fluid 1518, and at the same time a first piston rod 1524 extends outward from the first hydraulic cylinder 1510. Simultaneously, the first rod fluid 1522 volume decreases and the first rod fluid 1522 flows out of a first rod port 1516, the hydraulic fluid returning back through the first hydraulic control valve 1506 and returning to the hydraulic reservoir 1502.

A second hydraulic control valve 1508 is configured in a neutral position, and therefore the hydraulic fluid entering the second hydraulic control valve 1508 is simply returned to the hydraulic reservoir 1502, having performed no work on the second hydraulic cylinder 1512. In addition, since the second hydraulic control valve 1508 is in a neutral position, there is no hydraulic fluid flow at both a second head port 1526 and a second rod port 1528 of the second hydraulic cylinder 1512. Due to the incompressibility of the hydraulic fluid, the volumes of a second head fluid 1530 and a second rod fluid 1534 remain constant, and a second ram 1532 and a second piston rod 1536 maintain a static position.

Figure 15B:
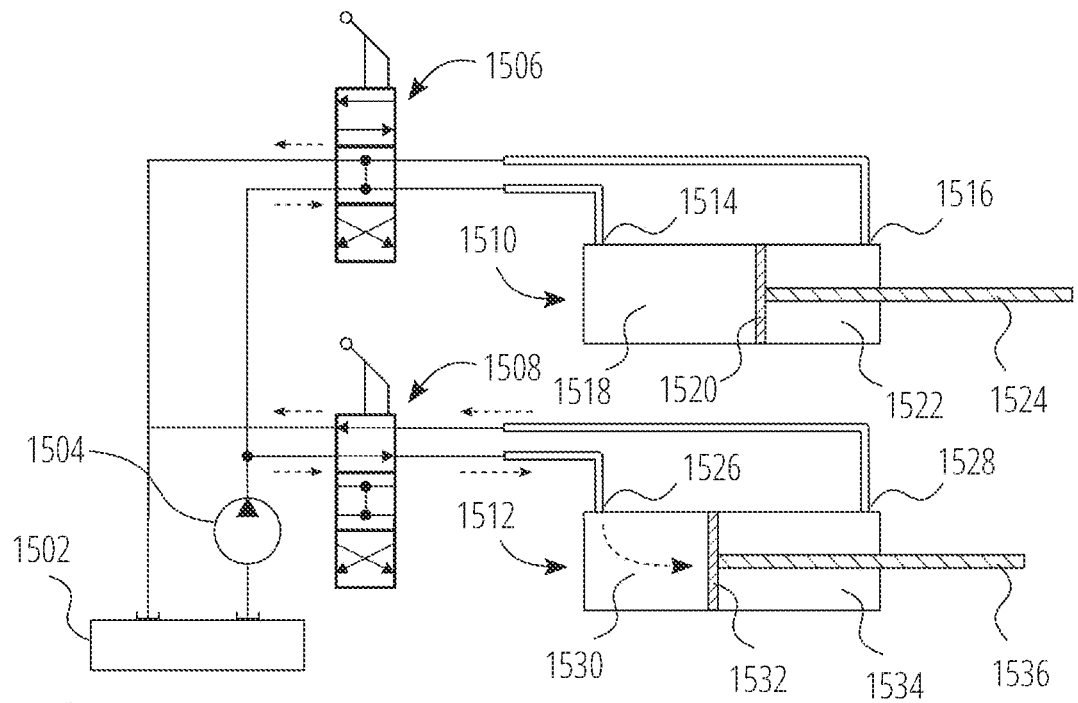
FIG. 15B is a hydraulic circuit diagram of the hydraulic circuit of FIG. 15A, showing the upper hydraulic control valve in the neutral position and the upper hydraulic cylinder piston rod in a static position, and also showing the lower hydraulic control valve in the open forward flow position and the lower hydraulic cylinder piston rod extending.

With reference to FIG. 15B, a hydraulic circuit diagram is shown of a hydraulic circuit configured to control two hydraulic cylinders, the first hydraulic cylinder 1510 and the second hydraulic cylinder 1512. The hydraulic reservoir 1502 holds a reservoir of hydraulic fluid that is pumped up to a high pressure by the hydraulic pump 1504.

The first hydraulic control valve 1506 is configured in a neutral position, and therefore the hydraulic fluid entering the first hydraulic control valve 1506 is simply returned to the hydraulic reservoir 1502, having performed no work on the first hydraulic cylinder 1510. Because the first hydraulic control valve 1506 is in a neutral position, there is no hydraulic fluid flow at both a first head port 1514 and a first rod port 1516 of the first hydraulic cylinder 1510. Due to the incompressibility of the hydraulic fluid, the volumes of a first head fluid 1518 and a first rod fluid 1522 remain constant, and a first ram 1520 and a first piston rod 1524 maintain a static position.

The second hydraulic control valve 1508 is configured in an open forward flow position, and therefore the high pressure hydraulic fluid flows through the second hydraulic control valve 1508 and through a second head port 1526 and into a second head fluid 1530. Because the second head fluid 1530 is at a higher pressure than a second rod fluid 1534, a second ram 1532 moves to the right, and in doing so expands the volume of the second head fluid 1530, and at the same time a second piston rod 1536 extends outward, from the second hydraulic cylinder 1512. Simultaneously, the second rod fluid 1534 volume decreases, and the second rod fluid 1534 flows out of a second rod port 1528, the hydraulic fluid returning back through the second hydraulic control valve 1508 and returning to the hydraulic reservoir 1502.

Figure 16B:
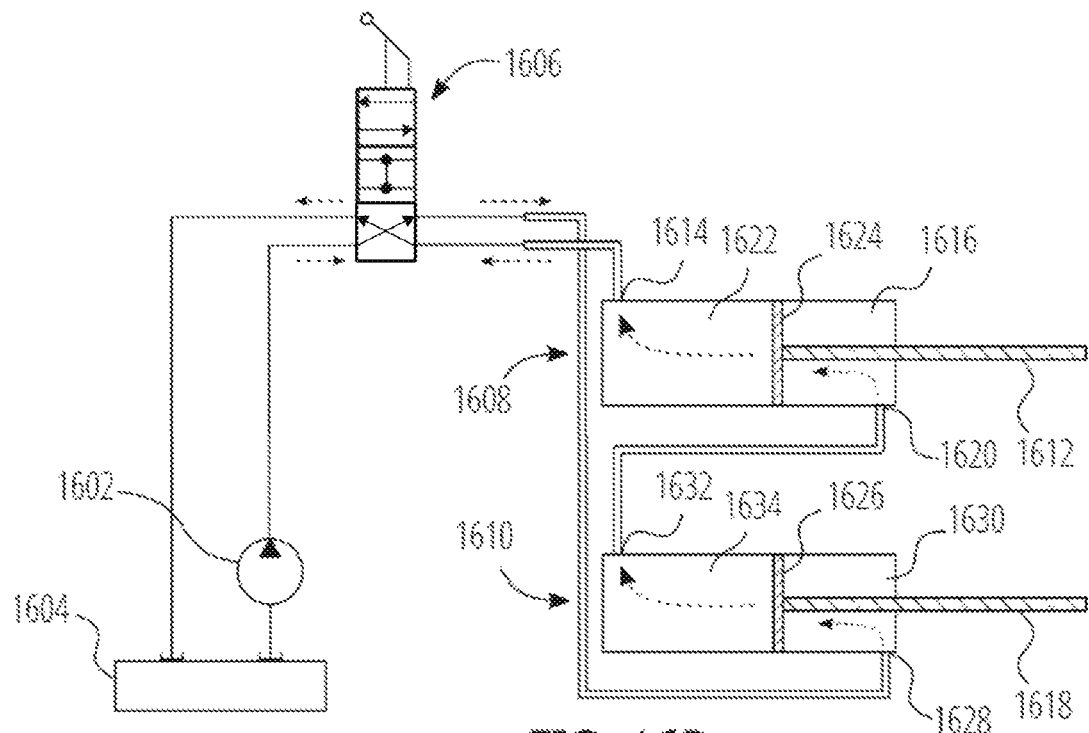
FIG. 16B is a hydraulic circuit diagram of the series hydraulic circuit of FIG. 16A, showing the hydraulic control valve in the open reverse flow position and both the first and second upper hydraulic cylinder piston rods retracting.

With reference to FIG. 16B, a hydraulic circuit diagram is shown of a series hydraulic circuit configured to control two hydraulic cylinders, a first hydraulic cylinder 1608 and a second hydraulic cylinder 1610.

A hydraulic reservoir 1604 holds a reservoir of hydraulic fluid that is pumped up to a high pressure by a hydraulic pump 1602.

A hydraulic control valve 1606 is configured in an open forward flow position, and therefore high pressure hydraulic fluid flows through the hydraulic control valve 1606 and through a first head port 1614 and into to a first head fluid 1622. Because the first head fluid 1622 is at a higher pressure than a first head first rod fluid 1616, a first ram 1624 moves to the right, and in doing so expands the volume of the first head fluid 1622, and at the same time a first piston rod 1612 extends outward from the first hydraulic cylinder 1608. Simultaneously, the first rod fluid 1616 volume decreases and the first rod fluid 1616 flows out of a first rod port 1620, the hydraulic fluid flowing into a second head port 1632 of the second hydraulic cylinder 1610.

Simultaneously, hydraulic fluid flows through the second head port 1632 and into to a second head fluid 1634. Because the second head fluid 1634 is at a higher pressure than a first second rod fluid 1630, a second ram 1626 moves to the right, and in doing so expands the volume of the second head fluid 1634, and at the same time a second piston rod 1618 extends outward from the second hydraulic cylinder 1610. Simultaneously, the second rod fluid 1630 volume decreases and the second rod fluid 1630 flows out of a second rod port 1628, the hydraulic fluid flowing returning back through the hydraulic control valve 1606 and returning to the hydraulic reservoir 1604.

Because of the incompressibility of the hydraulic fluid, the total volume of the first rod fluid 1616 and the second head fluid 1634 remain a constant. In addition, the two series hydraulic circuit cylinders, namely the first hydraulic cylinder 1608 and the second hydraulic cylinder 1610, are sized with matching cylinder diameters such that the movement of the first ram 1624 is equal to the movement of the second ram 1626. Accordingly, the movements of the first piston rod 1612 and the second piston rod 1618 are matched so that the extension amounts of the first piston rod 1612 and the second piston rod 1618 extend equally and move in tandem.

The self-leveling cylinder 144 and the boom extension hydraulic cylinder 126 of the front-end loader 100 are configured as a series hydraulic circuit. The series hydraulic circuit integrates the self-leveling hydraulics with the extension hydraulics of each extendable boom 118 (shown in FIG. 1A and FIG. 1B). The self-leveling cylinder 144 and the boom extension hydraulic cylinder 126 (both shown in FIG. 1A) are integrated and simultaneously work together to preserve the self-leveling function while each extendable boom 118 is being extended and retracted.

With reference to FIG. 16B, a hydraulic circuit diagram is shown of a series hydraulic circuit configured to control two hydraulic cylinders, the first hydraulic cylinder 1608 and the second hydraulic cylinder 1610.

The hydraulic reservoir 1604 holds a reservoir of hydraulic fluid that is pumped up to a high pressure by the hydraulic pump 1602.

The hydraulic control valve 1606 is configured in an open reverse flow position, and therefore high pressure hydraulic fluid flows through the hydraulic control valve 1606 and through the second rod port 1628 and into to the second rod fluid 1630. Because the second rod fluid 1630 is at a higher pressure than a first head second head fluid 1634, the second ram 1626 moves to the left, and in doing so expands the volume of the second rod fluid 1630, and at the same time the second piston rod 1618 retracts inward into the second hydraulic cylinder 1610. Simultaneously, the second head fluid 1634 volume decreases and the second head fluid 1634 flows out of the second head port 1632, the hydraulic fluid flowing into the first rod port 1620 of the first hydraulic cylinder 1608.

Simultaneously, hydraulic fluid flows through the first rod port 1620 and into the first rod fluid 1616. Because the first rod fluid 1616 is at a higher pressure than the first head fluid 1622, the first ram 1624 moves to the left, and in doing so expands the volume of the first rod fluid 1616, and at the same time the first piston rod 1612 retracts inward into the first hydraulic cylinder 1608. Simultaneously, the first head fluid 1622 volume decreases and the first head fluid 1622 flows out of the first head port 1614, the hydraulic fluid flowing returning back through the hydraulic control valve 1606 and returning to the hydraulic reservoir 1604.

Because of the incompressibility of the hydraulic fluid, the total volume of the second head fluid 1634 and the first rod fluid 1616 remain a constant. In addition, the two series hydraulic circuit cylinders, namely the first hydraulic cylinder 1608 and the second hydraulic cylinder 1610, are sized with matching cylinder diameters such that the movement of the first ram 1624 is equal to the movement of the second ram 1626. Accordingly, the movements of the first piston rod 1612 and the second piston rod 1618 are matched so that the extension amounts of the first piston rod 1612 and the second piston rod 1618 retract equally and move in tandem.

The self-leveling cylinder 144 and the boom extension hydraulic cylinder 126 of the front-end loader 100 are configured as a series hydraulic circuit. The series hydraulic circuit integrates the self-leveling hydraulics with the extension hydraulics of each extendable boom 118 (shown in FIG. 1A and FIG. 1B). The self-leveling cylinder 144 and the boom extension hydraulic cylinder 126 (both shown in FIG. 1A) are integrated and simultaneously work together to preserve the self-leveling function while each extendable boom 118 is being extended and retracted.

Figure 17:
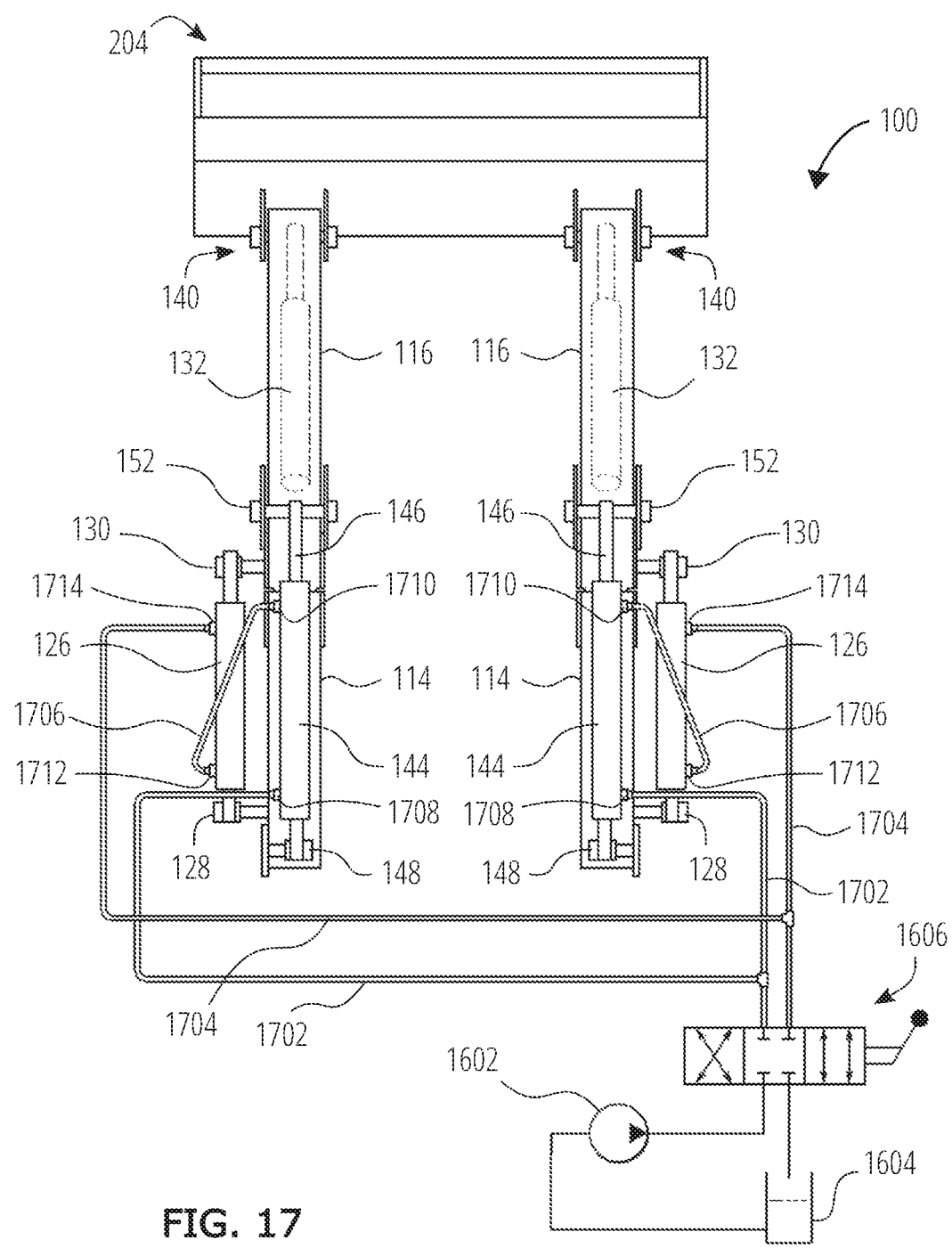
FIG. 17 is a top view of the front-end loader 100 attached to a bucket accessory, showing the hydraulic pump, the hydraulic control valve, two booms, and hydraulic hoses, the hydraulic hoses configured for each boom so as to connect the boom extension hydraulic cylinder and the self-leveling cylinder in a series hydraulic circuit.

With reference to FIG. 17, a top view of the front-end loader 100 attached to a bucket 204 is shown.

In this embodiment, for each boom 118 (shown in FIG. 1A), the self-leveling cylinder 144 is positioned above the proximal leg 114, and the boom extension hydraulic cylinder 126 is positioned on the outer side of the proximal leg 114.

The distal leg 116 of each boom 118 is extendable from the proximal leg 114. The boom extension hydraulic cylinder 126 and the self-leveling cylinder 144 are shown in retracted positions, and accordingly the distal leg 116 is in the retracted position with respect to the proximal leg 114. Each proximal leg 114 includes the boom extension hydraulic cylinder 126. The proximal end of the boom extension hydraulic cylinder 126 is attached to the proximal end of the proximal leg 114 at the proximal extension attachment 128. The distal end of the boom extension hydraulic cylinder 126 is attached to the proximal end of the distal leg 116 at the distal extension attachment 130.

The proximal end of each self-leveling cylinder 144 is attached to the self-leveling proximal attachment 148, and the distal end of the self-leveling cylinder piston rod 146 of each self-leveling cylinder 144 is attached to the self-leveling distal attachment 152.

The distal leg 116 includes a tilt hydraulic cylinder 132 which controls the tilt angle of an accessory, such as the bucket 204, the accessory being attached to and supported by the accessory support end 140.

For each boom 118 (shown in FIG. 1A), the self-leveling cylinder 144 and the boom extension hydraulic cylinder 126 are configured as a series hydraulic circuit.

The hydraulic reservoir 1604 holds a reservoir of hydraulic fluid that is pumped up to a high pressure by the hydraulic pump 1602. The hydraulic control valve 1606 is configured in one of: an open forward flow position, a open reverse flow position, and a neutral position.

In this embodiment, when the hydraulic control valve 1606 is configured in an open forward flow position, the boom extension hydraulic cylinder 126 and the self-leveling cylinder 144 extend, and each distal leg 116 extends. When the hydraulic control valve 1606 is configured in an open reverse flow position, the boom extension hydraulic cylinder 126 and the self-leveling cylinder 144 retract, and each distal leg 116 retracts. When the hydraulic control valve 1606 is configured in a neutral position, the boom extension hydraulic cylinder 126 and the self-leveling cylinder 144 maintain a static position, and each distal leg 116 maintains a static position.

In this embodiment, a hydraulic head hose 1702 is connected to a self-leveling head port 1708 of each self-leveling cylinder 144, and a hydraulic rod hose 1704 is connected to an extension rod port 1714 of each boom extension hydraulic cylinder 126. For each boom 118, a hydraulic series hose 1706 connects the self-leveling cylinder 144 and the boom extension hydraulic cylinder 126 in a series hydraulic circuit by connecting a self-leveling rod port 1710 of the self-leveling cylinder 144 to an extension head port 1712 of the boom extension hydraulic cylinder 126.

This series hydraulic circuit integrates the self-leveling hydraulics with the extension hydraulics of each extendable boom 118. The self-leveling cylinder 144 and the boom extension hydraulic cylinder 126 are integrated and simultaneously work together, by extending together and retracting together to preserve the self-leveling function while each extendable boom 118 is being extended and retracted.

The boom extension hydraulic cylinder 126 and the self-leveling cylinder 144 are configured in the series hydraulic circuit such that the boom extension hydraulic cylinder 126 and the self-leveling cylinder 144 each co-extend by a substantially equal distance, and the boom extension hydraulic cylinder 126 and the self-leveling cylinder 144 each co-retract by a substantially equal distance.

Other modifications and implementations will occur to those skilled in the art without departing from the spirit and the scope of the invention as claimed. Accordingly, the above description is not intended to limit the invention, except as indicated in the following claims.

What is claimed is:

1. A front-end loader for attachment to a tractor or a rubber tired construction backhoe, the front-end loader including hydraulic cylinders, each hydraulic cylinder having a cylinder barrel, a piston rod, a proximal end, and a distal end, the front-end loader comprising:
   a support structure configured to be attached to the tractor, the support structure having an upper attachment portion and a lower attachment portion;
   two booms, each boom including:
      a proximal leg having a pivot end and an extension end, the pivot end being pivotally attached to the upper attachment portion, and
      a boom extension hydraulic cylinder, having the proximal end attached to the proximal leg, and
      a distal leg having an extension end and an accessory support end, the extension end of the distal leg being attached to the distal end of the boom extension hydraulic cylinder, the distal leg including an extension shaft that is fixedly attached to the extension end of the distal leg, the extension shaft being slidably supported by a receptacle at the extension end of the proximal leg;
   a lift hydraulic cylinder having a proximal end and a distal end, the proximal end of the lift hydraulic cylinder pivotally attached to the lower attachment portion of the support structure, and the distal end of the lift hydraulic cylinder being pivotally attached to the extension end of the proximal leg;
   a tilt hydraulic cylinder having a proximal end and a distal end, the distal end of the tilt hydraulic cylinder being configured to pivotally attach to an implement assembly that is configured to be pivotally attached to the accessory support end of the distal leg; and
   a self-leveling linkage, including:
      a self-leveling cylinder, having a proximal end and a distal end, the proximal end of the self-leveling cylinder pivotally attached to the upper attachment portion of the support structure, the self-leveling cylinder being in fluid communication with the boom extension hydraulic cylinder, and the self-leveling cylinder and the boom extension hydraulic cylinder configured in a series hydraulic circuit, and
      a connecting linkage pivotally attached to the extension end of the distal leg, the connecting linkage pivotally connected to the distal end of the self-leveling cylinder, and the connecting linkage pivotally connected to the proximal end of the tilt hydraulic cylinder, such that a movement of the distal end of the self-leveling cylinder corresponds to a linked movement of the proximal end of the tilt hydraulic cylinder.

2. The front-end loader of claim 1, wherein the distal end of each distal leg of the two booms is configured to attach to an accessory, including at least one of: a bucket, pallet forks, hay forks, bale spears.

3. The front-end loader of claim 1, wherein the receptacle within the extension end of the proximal leg includes wear pads configured to slidably support the extension shaft of the distal leg.

4. The front-end loader of claim 1, wherein the boom extension hydraulic cylinder and the self-leveling cylinder are configured in the series hydraulic circuit such that the boom extension hydraulic cylinder and the self-leveling cylinder each co-extend by a substantially equal distance, and the boom extension hydraulic cylinder and the self-leveling cylinder each co-retract by a substantially equal distance.

5. The front-end loader of claim 1, wherein a cross member is attached to each of the two booms.

6. The front-end loader of claim 1, wherein each boom extension hydraulic cylinder extends a respective boom of the two booms by 2 to 4 feet.

7. The front-end loader of claim 1, wherein each boom extension hydraulic cylinder is configured to extend and retract the two booms AFTER the lift hydraulic cylinder has raised the two booms to a raised position.

8. The front-end loader of claim 1, further including:
   conventional wheel weights to provide additional counter weight for added stability.

9. The front-end loader of claim 1, wherein the distal leg of each boom extends from the proximal leg of the boom at a 105 to 135 degree angle.

* * * * *